US009682835B2

United States Patent
Kamatani

(10) Patent No.: US 9,682,835 B2
(45) Date of Patent: Jun. 20, 2017

(54) PHASE DETECTOR, MOTOR DRIVE CONTROLLER, MOTOR APPARATUS, SHEET FEEDER, AND METHOD OF DETECTING PHASE

(71) Applicant: Tomohiko Kamatani, Osaka (JP)

(72) Inventor: Tomohiko Kamatani, Osaka (JP)

(73) Assignee: RICOH COMPANY, LTD., Tokyo (JP)

( * ) Notice: Subject to any disclaimer, the term of this patent is extended or adjusted under 35 U.S.C. 154(b) by 49 days.

(21) Appl. No.: 14/936,904

(22) Filed: Nov. 10, 2015

(65) Prior Publication Data
US 2016/0145062 A1     May 26, 2016

(30) Foreign Application Priority Data

Nov. 21, 2014 (JP) .................................. 2014-236468

(51) Int. Cl.
| | | |
|---|---|---|
| G05B 11/12 | (2006.01) | |
| B65H 5/02 | (2006.01) | |
| H02P 6/16 | (2016.01) | |
| G01D 5/243 | (2006.01) | |

(52) U.S. Cl.
CPC ............ *B65H 5/021* (2013.01); *G01D 5/243* (2013.01); *H02P 6/16* (2013.01); *B65H 2211/00* (2013.01)

(58) Field of Classification Search
CPC ............ B65H 5/021; G01D 5/243; H02P 6/12
USPC ........................................................ 318/683
See application file for complete search history.

(56) References Cited

U.S. PATENT DOCUMENTS

| | | | | |
|---|---|---|---|---|
| 5,122,715 A | * | 6/1992 | Kimura ..................... | H02P 6/06 318/400.06 |
| 2008/0297079 A1 | * | 12/2008 | Kanamori ................. | H02P 6/18 318/400.06 |
| 2013/0043817 A1 | * | 2/2013 | Shibuya .................. | H02P 6/002 318/400.33 |
| 2013/0099708 A1 | | 4/2013 | Shimizu et al. | |
| 2013/0106326 A1 | | 5/2013 | Kamatani et al. | |
| 2013/0106327 A1 | | 5/2013 | Kamatani et al. | |

(Continued)

FOREIGN PATENT DOCUMENTS

| | | |
|---|---|---|
| JP | 8-321984 | 12/1996 |
| JP | 2006-42476 | 2/2006 |

(Continued)

OTHER PUBLICATIONS

Apr. 20, 2016 European Search Report in corresponding European Patent Application No. EP 15195056.5.

*Primary Examiner* — Erick Glass
(74) *Attorney, Agent, or Firm* — Cooper & Dunham LLP

(57) ABSTRACT

A phase detector is provided. The phase detector includes a signal selector, a bias level generator, and a phase information detector. The signal selector selects, as a selected sensor signal, one of a plurality of sensor signals each having a signal level corresponding to a phase of a rotor. The bias level generator divides a signal level difference between a pair of sensor signals, including the selected sensor signal and other sensor signal of the plurality of sensor signals other than the selected sensor signal, at a first ratio, to generate a first bias level. The phase information detector generates a threshold level corresponding to the phase of the rotor based on the first bias level, and detects the signal level of the selected sensor signal reaching the threshold level.

15 Claims, 14 Drawing Sheets

(56) References Cited

U.S. PATENT DOCUMENTS

2015/0253159 A1 9/2015 Kamatani
2015/0256328 A1 9/2015 Kamatani

FOREIGN PATENT DOCUMENTS

JP 2013-099023 5/2013
JP 2015-169528 9/2015

* cited by examiner

PHASE DETECTOR, MOTOR DRIVE CONTROLLER, MOTOR APPARATUS, SHEET FEEDER, AND METHOD OF DETECTING PHASE

CROSS-REFERENCE TO RELATED APPLICATIONS

This patent application is based on and claims priority pursuant to 35 U.S.C. §119(a) to Japanese Patent Application No. 2014-236468, filed on Nov. 21, 2014, in the Japan Patent Office, the entire disclosure of which is hereby incorporated by reference herein.

BACKGROUND

Technical Field

The present disclosure relates to a phase detector, a motor drive controller using the phase detector, a motor apparatus using the motor drive controller, a sheet feeder using the motor apparatus, and a method of detecting phase.

Description of the Related Art

A technology of detecting the rotation phase of a rotor is known. Such a technology is used for controlling the rotation position of a motor, in particular, for a stop control of a brushless direct current (DC) motor. As an example, a rotary encoder method is known. In this method, a rotary encoder is connected to a rotation shaft, which is used to detect the relative rotation angle based on a biphase pulse signal having a phase difference that is variable according to the rotation phase.

The rotary encoder method is generally expensive due to the use of additional parts: a circular disc having optical window slits on its outer periphery at regular intervals and two photointerrupters arranged at a ¼ interval of the slit interval.

SUMMARY

In accordance with some embodiment of the present invention, a phase detector is provided. The phase detector includes a signal selector, a bias level generator, and a phase information detector. The signal selector selects, as a selected sensor signal, one of a plurality of sensor signals each having a signal level corresponding to a phase of a rotor. The bias level generator divides a signal level difference between a pair of sensor signals, including the selected sensor signal and other sensor signal of the plurality of sensor signals other than the selected sensor signal, at a first ratio, to generate a first bias level. The phase information detector generates a threshold level corresponding to the phase of the rotor based on the first bias level, and detects the signal level of the selected sensor signal reaching the threshold level.

In accordance with some embodiments of the present invention, a motor drive controller is provided. The motor drive controller includes the above phase detector, a motor controller, and a motor driver. The phase detector outputs a phase detection result. The motor controller outputs a signal based on the phase detection result. The motor driver drives a motor based on the signal.

In accordance with some embodiments of the present invention, a motor apparatus is provided. The motor apparatus includes the above motor drive controller and a motor to be driven by the motor drive controller.

In accordance with some embodiments of the present invention, a sheet feeder is provided. The sheet feeder includes the above motor apparatus, a plurality of rollers, and a belt. At least one of the plurality of rollers is to be driven by the motor apparatus. The belt is stretched across the plurality of rollers to be fed by the plurality of rollers.

In accordance with some embodiments of the present invention, a method of detecting phase is provided. The method includes the steps of: selecting, as a selected sensor signal, one of a plurality of sensor signals each having a signal level corresponding to a phase of a rotor; dividing a signal level difference between a pair of sensor signals, including the selected sensor signal and other sensor signal of the plurality of sensor signals other than the selected sensor signal, at a first ratio, to generate a first bias level; generating a threshold level corresponding to the phase of the rotor based on the first bias level; and detecting the signal level of the selected sensor signal reaching the threshold level.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
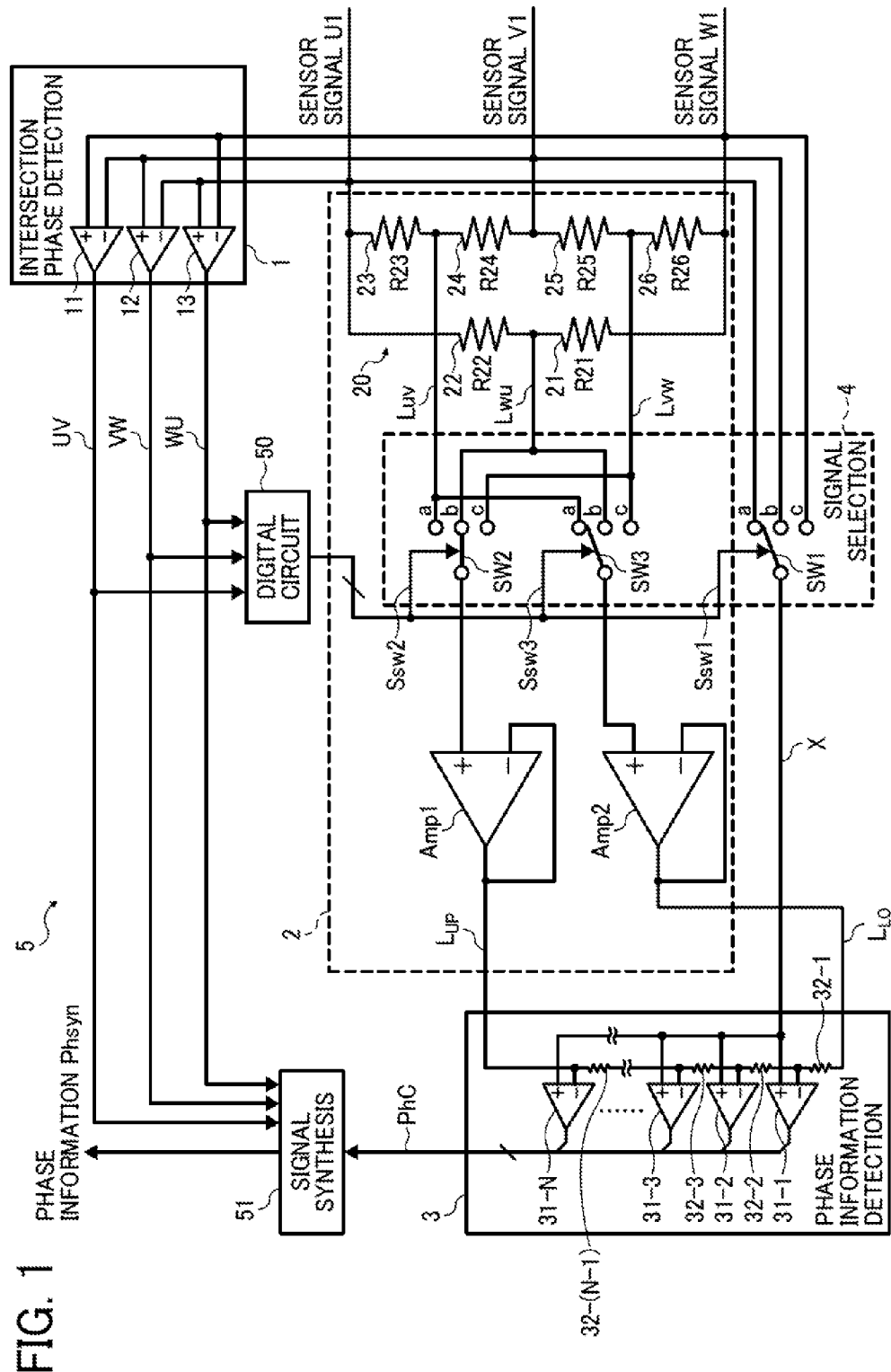
FIG. 1 is a block diagram showing the configuration of a phase detector 5 in accordance with an embodiment (Embodiment 3) of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Related-art phase detection technologies generally have a problem that the phase detection accuracy may decrease upon fluctuation of sensor signals caused by external environmental conditions.

In accordance with some embodiments of the present invention, a phase detector having an improved accuracy in phase detection using sensor signals each having a signal level depending on rotation phase is provided.

Embodiment 1

FIG. 1 is a block diagram showing the configuration of a phase detector 5 in accordance with an embodiment (Embodiment 1) of the present invention. Referring to FIG. 1, the phase detector 5 includes an intersection phase detection circuit 1, a bias level generation circuit 2, a phase information detection circuit 3, a digital circuit 50, and a signal synthesis circuit 51. The intersection phase detection circuit 1 includes comparators 11, 12, and 13. The bias level generation circuit 2 includes a voltage dividing circuit 20, switches SW2 and SW3, and buffer amplifiers Amp1 and Amp2. The voltage dividing circuit 20 includes resistances 21 to 26 respectively having a resistance value of R21 to R26. The phase information detection circuit 3 includes comparators 31-1 to 31-N and resistances 32-1 to 32-N.

Referring to FIG. 1, multiple sensor signals U1, V1, and W1 are generated by multiple sensors which may be Hall elements disposed around a motor. Each of the sensor signals has a signal level corresponding to the rotation phase of the rotor of the motor. The sensor signals U1, V1, and W1 have a predetermined phase difference (e.g., 120°) with each other according to the install positions thereof. The sensor signals U1, V1, and W1 are input to respective terminals a, b, and c of a switch SW1, input to the respective comparators 11, 12, and 13 of the intersection phase detection circuit 1, and further input to the voltage dividing circuit 20 of the bias level generation circuit 2.

In the intersection phase detection circuit 1, the comparator 11 compares the signal level of the sensor signal U1 with that of the sensor signal V1, and generates a detection signal UV indicating the phase (timing) of the intersection of the sensor signals U1 and V1. Similar to the comparator 11, the comparator 12 compares the sensor signals V1 and W1 and generates a detection signal VW indicating the phase of the intersection of the sensor signals V1 and W1. Similar to the comparator 11, the comparator 13 compares the sensor signals W1 and U1 and generates a detection signal WU indicating the phase of the intersection of the sensor signals W1 and U1.

Figure 2:
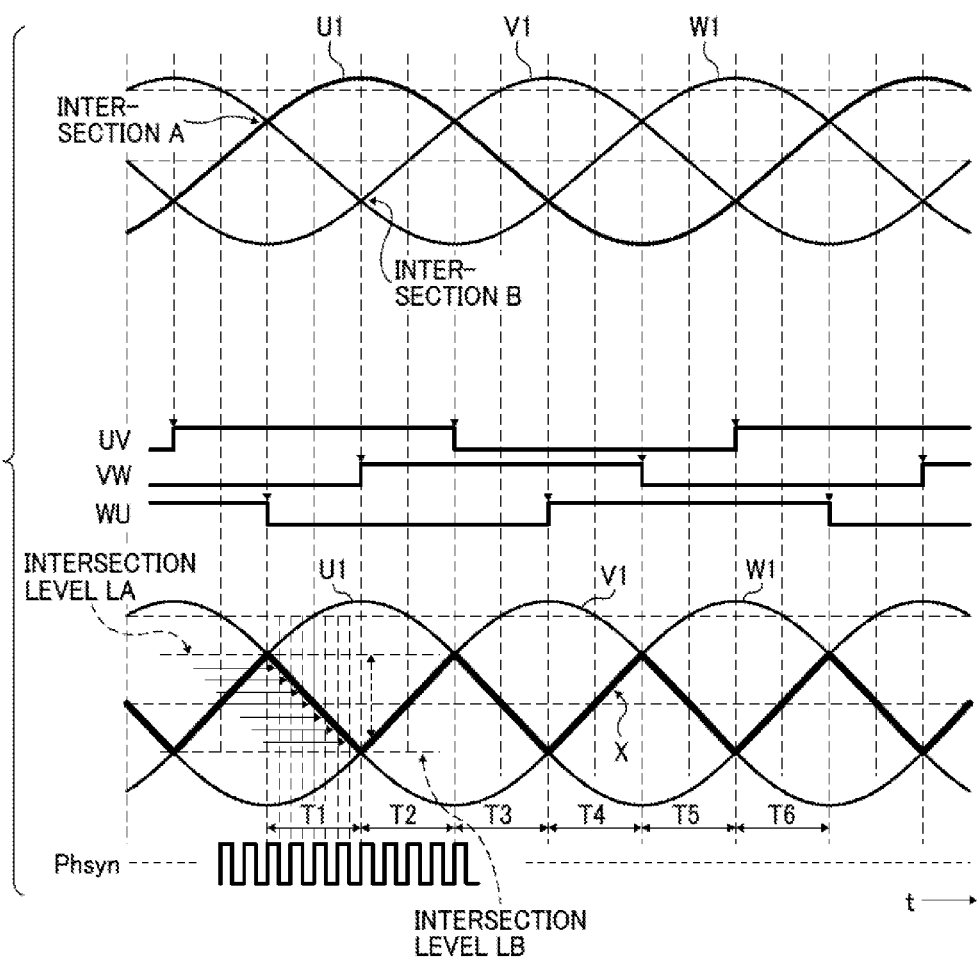
FIG. 2 is a timing diagram for various signals showing an operation state of the phase detector 5 illustrated in FIG. 1.

In the present embodiment, when the signal level of the sensor signal U1 is equal to or greater than that of the sensor signal V1, the comparator 11 generates a detection signal UV having a high level (Hi). When the signal level of the sensor signal U1 is less than that of the sensor signal V1, the comparator 11 generates a detection signal UV having a low level (Low). Similar to the comparator 11, each of the comparators 12 and 13 also generates binary detection signals VW and WU, respectively, as shown in FIG. 2. The comparators 11 to 13 of the intersection phase detection circuit 1 output the respective detection signals UV, VW, and WU to the digital circuit 50 and the signal synthesis circuit 51.

The digital circuit 50 generates a control signal Ssw1 based on the detection signals UV, VW, and WU and performs a selection control for the terminals a, b, and c of the switch SW1 as follows.

(1) Select the terminal a of the switch SW1 when the detection signals WU and UV are high (Hi) and VW is low (Low), or the detection signals WU and UV are low (Low) and VW is high (Hi).

(2) Select the terminal b of the switch SW1 when the detection signals UV and VW are high (Hi) and WU is low (Low), or the detection signals UV and VW are low (Low) and WU is high (Hi).

(3) Select the terminal c of the switch SW1 when the detection signals VW and WU are high (Hi) and UV is low (Low), or the detection signals VW and WU are low (Low) and UV is high (Hi).

The switches SW1 to SW3 configure a signal selector 4. The signal selector 4 outputs a selected sensor signal X that is one of the sensor signals U1, V1, and W1 to the comparators 31-1 to 31-N of the phase information detection circuit 3.

In the voltage dividing circuit 20 of the bias level generation circuit 2, the resistances 21 to 26 are connected to each other in series. The sensor signal U1 is input to a contact point between the resistances 22 and 23, the sensor signal V1 is input to a contact point between the resistances 24 and 25, and the sensor signal W1 is input to a contact point between the resistances 26 and 21. The voltage dividing circuit 20 divides the signal level difference between the sensor signals U1 and V1 at a ratio according to the ratio between the resistance values R23 and R24 in between the resistances 23 and 24, and outputs a voltage dividing level Luv to the terminal a of each of the switches SW2 and SW3. The voltage dividing level Luv has a signal level which divides the signal level difference between the sensor signals U1 and V1 at the ratio R22:R23.

Similarly, the voltage dividing circuit 20 generates a voltage dividing level Lwu that divides the signal level difference between the sensor signals W1 and U1 at the ratio R21:R22 and a voltage dividing level Lvw that divides the signal level difference between the sensor signals V1 and W1 at the ratio R25:R26. The voltage dividing level Lwu is output to the terminal b of each of the switches SW2 and SW3, and the voltage dividing level Lvw is output to the terminal c of each of the switches SW2 and SW3.

The digital circuit 50 generates a control signal Ssw2 based on the detection signals UV, VW, and WU and performs a selection control for the terminals a, b, and c of the switch SW2 as follows.

(1) Select the terminal a of the switch SW2 when the detection signals UV and VW are high (Hi) and WU is low (Low), or the detection signals WU and UV are low (Low) and VW is high (Hi).

(2) Select the terminal b of the switch SW2 when the detection signals WU and UV are high (Hi) and VW is low (Low), or the detection signals VW and WU are low (Low) and UV is high (Hi).

(3) Select the terminal c of the switch SW2 when the detection signals VW and WU are high (Hi) and UV is low (Low), or the detection signals UV and VW are low (Low) and WU is high (Hi).

The digital circuit 50 generates a control signal Ssw3 based on the detection signals UV, VW, and WU and performs a selection control for the terminals a, b, and c of the switch SW3 as follows.

(1) Select the terminal a of the switch SW3 when the detection signals WU and UV are high (Hi) and VW is low (Low), or the detection signals UV and VW are low (Low) and WU is high (Hi).

(2) Select the terminal b of the switch SW3 when the detection signals VW and WU are high (Hi) and UV is low (Low), or the detection signals WU and UV are low (Low) and VW is high (Hi).

(3) Select the terminal c of the switch SW3 when the detection signals UV and VW are high (Hi) and WU is low (Low), or the detection signals VW and WU are low (Low) and UV is high (Hi).

According to the above-described selection control, one of the voltage dividing levels Luv, Lvw, and Lwu is selected by each of the switches SW2 and SW3 in the signal selector 4. The voltage dividing levels selected by the switches SW2 and SW3 are respectively identified as an upper end bias level $L_{UP}$ and a lower end bias level $L_{LO}$. The signal selector 4 outputs the upper end bias level $L_{UP}$ and the lower end bias level $L_{LO}$ to the phase information detection circuit 3 through the respective buffer amplifiers Amp1 and Amp2.

In the phase information detection circuit 3, the multiple resistances 32-1 to 32-(N−1) are connected to each other in series in between the upper end bias level $L_{UP}$ and the lower end bias level $L_{LO}$. Each of the resistances 32-1 to 32-(N−1) divides the difference between the upper end bias level $L_{UP}$ and the lower end bias level $L_{LO}$ at a ratio according to the resistance value thereof. The divided voltages are respectively supplied to the comparators 31-1 to 31-N as threshold levels Lv(1) to Lv(N), respectively.

A comparator 31-n compares the selected sensor signal X with a threshold level Lv(n). When the selected sensor signal X is in excess of the threshold level Lv(n), the comparator 31-n outputs a high-level binary signal. By contrast, when the selected sensor signal X is less than the threshold level Lv(n), the comparator 31-n outputs a low-level binary signal. The phase information detection circuit 3 outputs to the signal synthesis circuit 51 a phase information signal PhC that includes all the binary signals, i.e., comparison results, output from the comparators 31-1 to 31-N. In the phase information detection circuit 3, the comparators 31-1 to 31-N detect the signal level of the selected sensor signal X reaching the respective threshold levels Lv(1) to Lv(N) each corresponding to the predetermined rotation phases.

The signal synthesis circuit 51 then outputs a phase information signal Phsyn that may be a toggle signal synthesized by exclusive OR based on the phase information signal PhC and the detection signals UV, VW, and WU.

In the phase detector 5 having the configuration as described above, the phase information of the rotor can be detected based on the sensor signals U1, V1, and W1 as follows.

FIG. 2 is a timing diagram for various signals showing an operation state of the phase detector 5 illustrated in FIG. 1. In FIG. 2, the sensor signals U1, V1, and W1 are each represented by sine wave (which may be replaced with other types of waveform substantially equivalent to sine wave) and set apart at a phase difference interval of 120° in terms of electrical angle.

The intersection phase detection circuit 1 illustrated in FIG. 1 generates the detection signals UV, VW, and WU by comparing the sensor signals U1, V1, and W1 illustrated in FIG. 2. Based on the detection signals UV, VW, and WU, the signal selector 4 selects one of the sensor signals U1, V1, and W1 for every phase section formed between intersections of the sensor signals U1, V1, and W1 to obtain the selected sensor signal X. The selected sensor signal X thus obtained is a temporally-continuous signal as shown by thick lines in the lower part of FIG. 2.

The selected sensor signal X is preferably composed of the following sections:

(1) A phase section T1 wherein the sine wave phase of the sensor signal W1 ranges from 150° to 210°;

(2) A phase section T2 wherein the sine wave phase of the sensor signal V1 ranges from −30° to 30°;

(3) A phase section T3 wherein the sine wave phase of the sensor signal U1 ranges from 150° to 210°;

(4) A phase section T4 wherein the sine wave phase of the sensor signal W1 ranges from −30° to 30°;

(5) A phase section T5 wherein the sine wave phase of the sensor signal V1 ranges from 150° to 210°; and (6) A phase section T6 wherein the sine wave phase of the sensor signal U1 ranges from −30° to 30°.

The selected sensor signal X shows a higher linearity within the above-described 60°-interval sections T1 to T6 compared to other 60°-interval sections where the sine wave phase ranges from 30° to 90°, 90° to 150°, 210° to 270°, or 270° to 310°. Thus, the selected sensor signal X composed of the phase sections T1 to T6 provides a higher degree of phase detection accuracy compared to a case of being composed of other phase sections.

The boundaries of each of the phase sections T1 to T6 are defined by the phases of an intersection pair A and B of the sensor signals U1, V1, and W1. In FIG. 2, the sensor signals U1, V1, and W1 are assumed as ideal sine waves having a phase difference of 120° with each other. Therefore, the signal level of each intersection of the sensor signals U1, V1, and W1 is equal to an intersection level LA or an intersection level LB.

Figure 3:
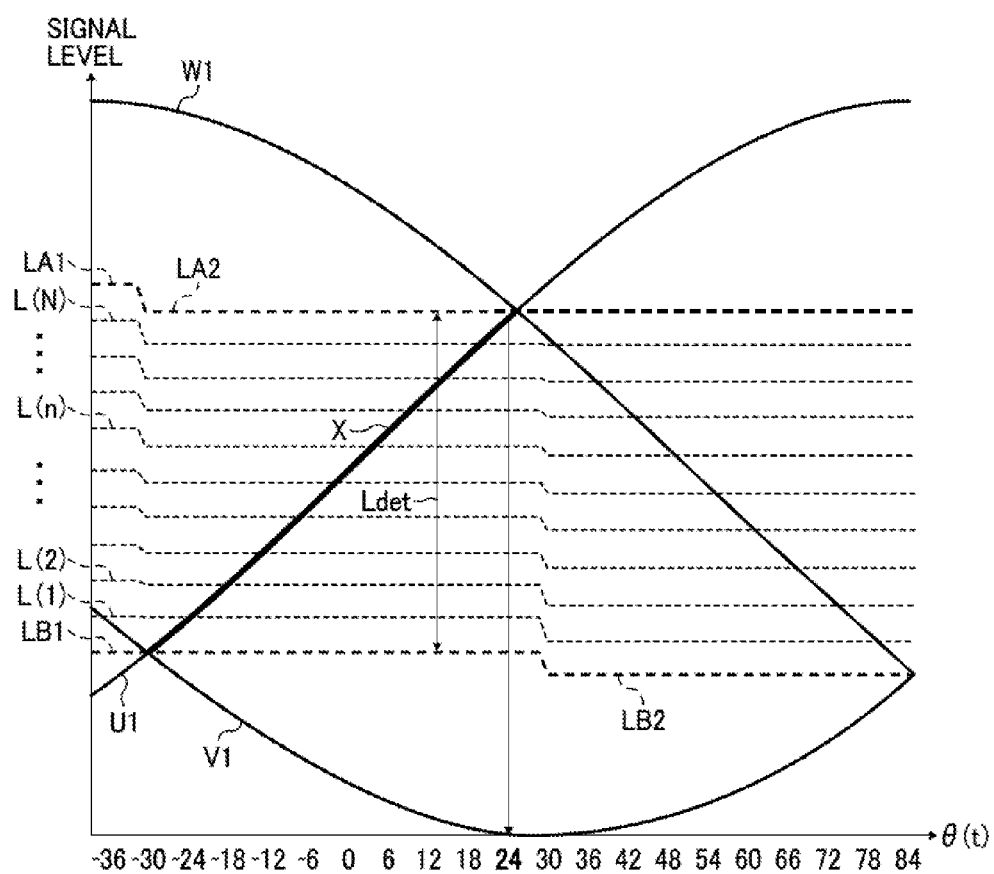
FIG. 3 is a waveform diagram showing fluctuations of the sensor signals U1, V1, and W1 illustrated in FIG. 1.

FIG. 3 is a waveform diagram showing fluctuations of the sensor signals U1, V1, and W1 illustrated in FIG. 1. Referring to FIG. 3, the sensor signals U1, V1, and W1 have fluctuations caused due to external environment conditions. Therefore, the phase difference between the sensor signals U1, V1, and W1 is deviated from 120°. The sensor signals U1, V1, and W1 fluctuate due to various causes such as phase shift among the signals or distortion caused by harmonic components. In such a case, in contrast to the case that the sensor signals U1, V1, and W1 are ideal sine waves as illustrated in FIG. 2 in which the intersection levels LA and LB of the intersections A and B are equal within the phase sections T1 to T6, the intersection levels may shift, for example, from LA1 to LA2 or from LB1 to LB2 as shown in FIG. 3. Therefore, if a detection section Ldet, within which the signal level of the selected sensor signal X is detected, is fixed over the phase sections T1 to T6, an error may be caused in phase detection.

Such a problem of phase detection error may be solved by detecting and memorizing the intersection levels LA1 and LB1 and the intersection levels LA2 and LB2 for every phase sections T1 to T6 separately, and switching the detection section Ldet for every phase sections T1 to T6. In such a case, the threshold levels L(1) to L(N) are set as fixed values for every phase sections T1 to T6. Since the detection section Ldet is set for every phase sections T1 to T6, this method requires a huge circuit area so that a circuit can memorize various bias levels.

Another problem of this method is that, in the case where the input signal is periodic as is the case with the sensor signals U1, V1, and W1, a phase detection error caused before their signal levels reaching an intersection level cannot be handled since the past intersection levels are memorized. Moreover, since the detection section Ldet is set by detecting and memorizing each intersection level, a phase detection error may be caused if the signal amplitude is changed from that at the time of detection. In view of this situation, in the present embodiment, the threshold levels Lv(1) to Lv(N) are generated based on the bias levels $L_{UP}$ and $L_{LO}$ according to the voltage dividing levels Luv, Lvw, and Lwu, as described below.

Figure 4:
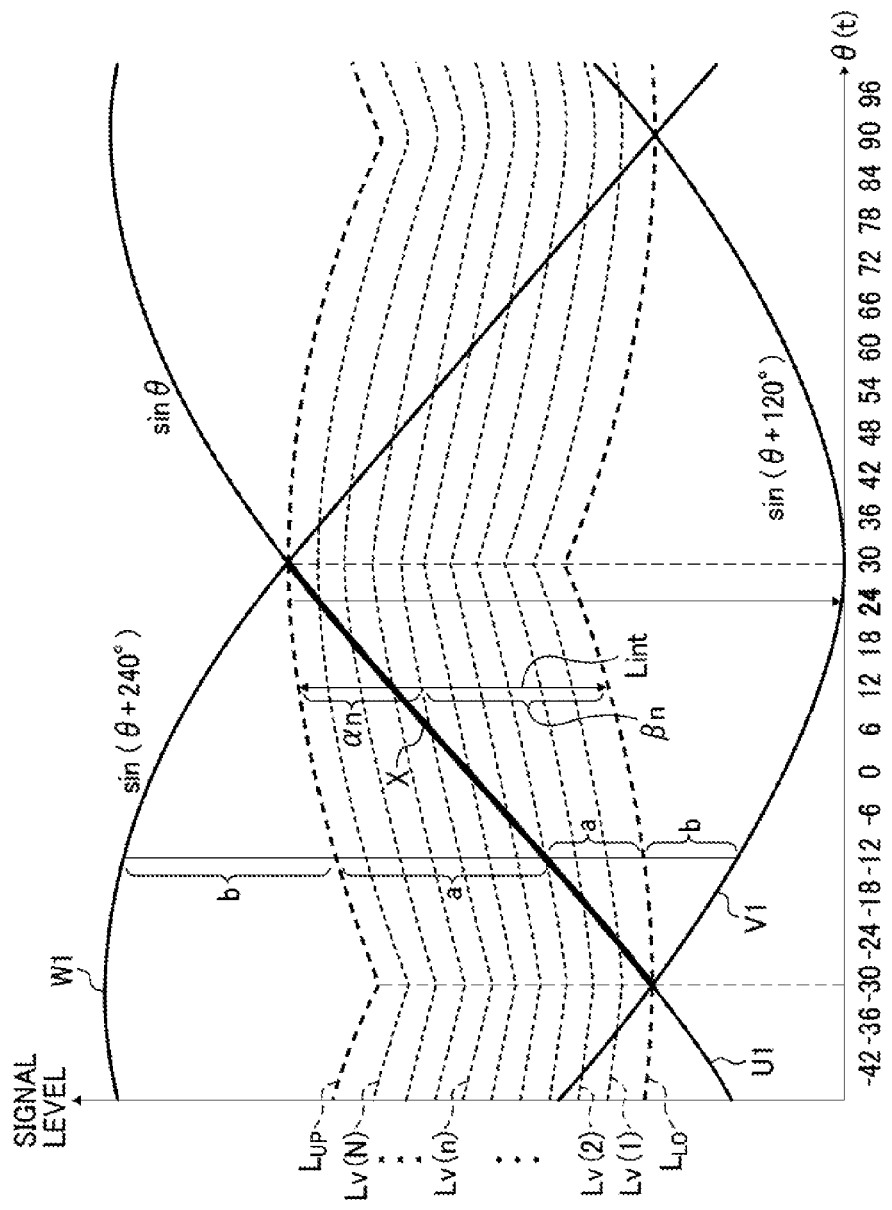
FIG. 4 is a waveform diagram of the sensor signals U1, V1, and W1 showing a phase detection operation of the phase detector 5 illustrated in FIG. 1.

FIG. 4 is a waveform diagram of the sensor signals U1, V1, and W1 showing a phase detection operation of the phase detector 5 illustrated in FIG. 1. In FIG. 4, the sensor signals U1, V1, and W1 are illustrated as sine waves. The sensor signal V1 has a phase difference of 120° between the sensor signal U1. The sensor signal W1 has a phase difference of 240° between the sensor signal U1. A phase detection operation of the phase detector 5 in the case in which the selected sensor signal X is the sensor signal U1 within the phase section of −30° to 30° is described below with reference to FIG. 4.

Referring to FIG. 4, the threshold levels Lv(1) to Lv(N) are set for every and each detection section Lint so as to detect whether or not the phase of the selected sensor signal X reaches each detection phase $\theta_1$ to $\theta_N$ set apart with a phase difference of 6°. The detection section Lint is a signal level section defined between the upper end bias level $L_{UP}$ and the lower end bias level $L_{LO}$. In the present embodiment, the bias level generation circuit 2 sets the upper end bias level $L_{UP}$ by diving the signal level difference between the selected sensor signal X and a sensor signal having a signal level greater than that of the selected sensor signal X at the ratio (internal ratio) a:b. In addition, the bias level generation circuit 2 sets the lower end bias level $L_{LO}$ by diving the signal level difference between the selected sensor signal X and a sensor signal having a signal level smaller than that of the selected sensor signal X at the ratio a:b.

In FIG. 4, the selected sensor signal X is the sensor signal U1 (X=U1), and the sensor signal V1 is smaller than the sensor signal U1 and the sensor signal U1 is smaller than the sensor signal W1 (V1<U1<W1). In this case, the signal selector 4 illustrated in FIG. 1 selects the voltage dividing level Lwu and voltage dividing level Luv as the upper end bias level $L_{UP}$ and lower end bias level $L_{LO}$, respectively, based on the detection signals UV, VW, and WU. To achieve the above-described internal ratio, the resistance values R21 to R24 of the respective resistances 21 to 24 in the voltage dividing circuit 20 are set satisfying the following equation: R22:R21=R23:R24=a:b. The bias levels $L_{UP}$ and $L_{LO}$ are represented by the following formulae (1) and (2), respectively.

$$L_{UP}=(b \times U1+a \times W1)/(a+b) \qquad (1)$$

$$L_{LO}=(b \times U1+a \times V1)/(a+b) \qquad (2)$$

Each threshold level Lv(n) (n=1, 2, . . . , N) is set by dividing the detection section Lint defined between the upper end bias level $L_{UP}$ and the lower end bias level $L_{LO}$ at the ratio αn:βn. The detection section Lint fluctuates along with the sensor signals U1, V1, and W1 depending on the bias levels $L_{UP}$ and $L_{LO}$. In FIG. 4, as described above, the sensor signals U1, V1, and W1 are illustrated as sine waves respectively represented by sin θ, sin(θ+120°), and sin(θ+240°). (U1=sin θ, V1=sin(θ+120°), W1=sin(θ+240°)) Therefore, the ratio αn:βn can be represented by the following formulae (3-1) to (3-3) using the detection phase $\theta_n$.

$$\alpha n{:}\beta n = L_{UP}(\theta_n)-\sin(\theta_n){:}\sin(\theta_n)-L_{LO}(\theta_n) \qquad (3\text{-}1)$$

$$L_{UP}(\theta_n)=(b \times \sin(\theta_n)+a \times \sin(\theta_n+240°))/(a+b) \qquad (3\text{-}2)$$

$$L_{LO}(\theta_n)=(b \times \sin(\theta_n)+a \times \sin(\theta_n+120°))/(a+b) \qquad (3\text{-}3)$$

The resistance value of a resistance 32-n in the phase information detection circuit 3 illustrated in FIG. 1 is set so as to include the ratio αn:βn according to the formula (3) for a desired detection phase $\theta_n$. The ratio a:b is one example of the first ratio, and the ratio αn:βn is one example of the second ratio.

Owing to the selection control for the switches SW2 and SW3 by the respective control signals Ssw2 and Ssw3, the upper end bias level $L_{UP}$ and the lower end bias level $L_{LO}$ are continuously supplied over the phase sections T1 to T6 of the selected sensor signal X illustrated in FIG. 2. Therefore, in each of the phase sections T1 to T6, the phase of the selected sensor signal X can be detected as is shown in FIG. 4. In Embodiment 1, the ratio a:b equals to 1:1. Accordingly, the following equations are satisfied: R21=R22, R23=R24, and R25=R26.

According to the bias levels $L_{UP}$ and $L_{LO}$ output from the bias level generation circuit 2, each threshold level Lv(n) is generated by dividing the detection section Lint at the ratio αn:βn, as described above. Since the detection section Lint fluctuates in accordance with fluctuation of the sensor signals U1, V1, and W1, phase detection can be performed with a high degree of accuracy. Even when the signal amplitudes of the sensor signals U1, V1, and W1 fluctuate, the bias levels $L_{UP}$ and $L_{LO}$ come to coincide with the intersection level of each intersection of the sensor signals U1, V1, and W1. Therefore, it is possible to drastically reduce the circuit area compared to that of a circuit for detecting and memorizing intersection levels.

According to the present embodiment, the phase detector 5 includes the signal selector 4, the bias level generation circuit 2, and the phase information detection circuit 3. The signal selector 4 selects one sensor signal, as the selected sensor signal X, from the multiple sensor signals U1, V1, and W1 each having a signal level corresponding to the phase of the rotor. The bias level generation circuit 2 generates the bias levels $L_{UP}$ and $L_{LO}$ by dividing the signal level difference between a pair of the selected sensor signal X and another sensor signal at the ratio a:b. The phase information detection circuit 3 generates a threshold level Lv(n) corresponding to the phase of the rotor based on the bias levels $L_{UP}$ and $L_{LO}$, and detects the signal level of the selected sensor signal X reaching the threshold level Lv(n).

The phase detector 5 can improve an accuracy in phase detection by using the sensor signals U1, V1, and W1 each having a signal level corresponding to the rotation phase.

According to Embodiment 1, the phase detector 5 includes the intersection phase detection circuit 1 and the signal synthesis circuit 51. According to another embodiment, the phase detector 5 needs not necessarily include the intersection phase detection circuit 1 and the signal synthesis circuit 51. In this case, for example, the phase information detection circuit 3 may output the phase information signal PhC as a signal indicating the phase detection result.

In FIG. 4, the sensor signals U1, V1, and W1 are illustrated as sine waves, but the waveforms thereof are not limited thereto. For example, the sensor signals U1, V1, and W1 may have a waveform similar to that of sine wave, such as substantially sine wave or substantially trapezoidal wave. It is possible to set the ratio αn:βn for a desired detection phase $\theta_n$ by reflecting a contribution of harmonic components of the sensor signals to the formula (3).

Embodiment 2

Figure 5:
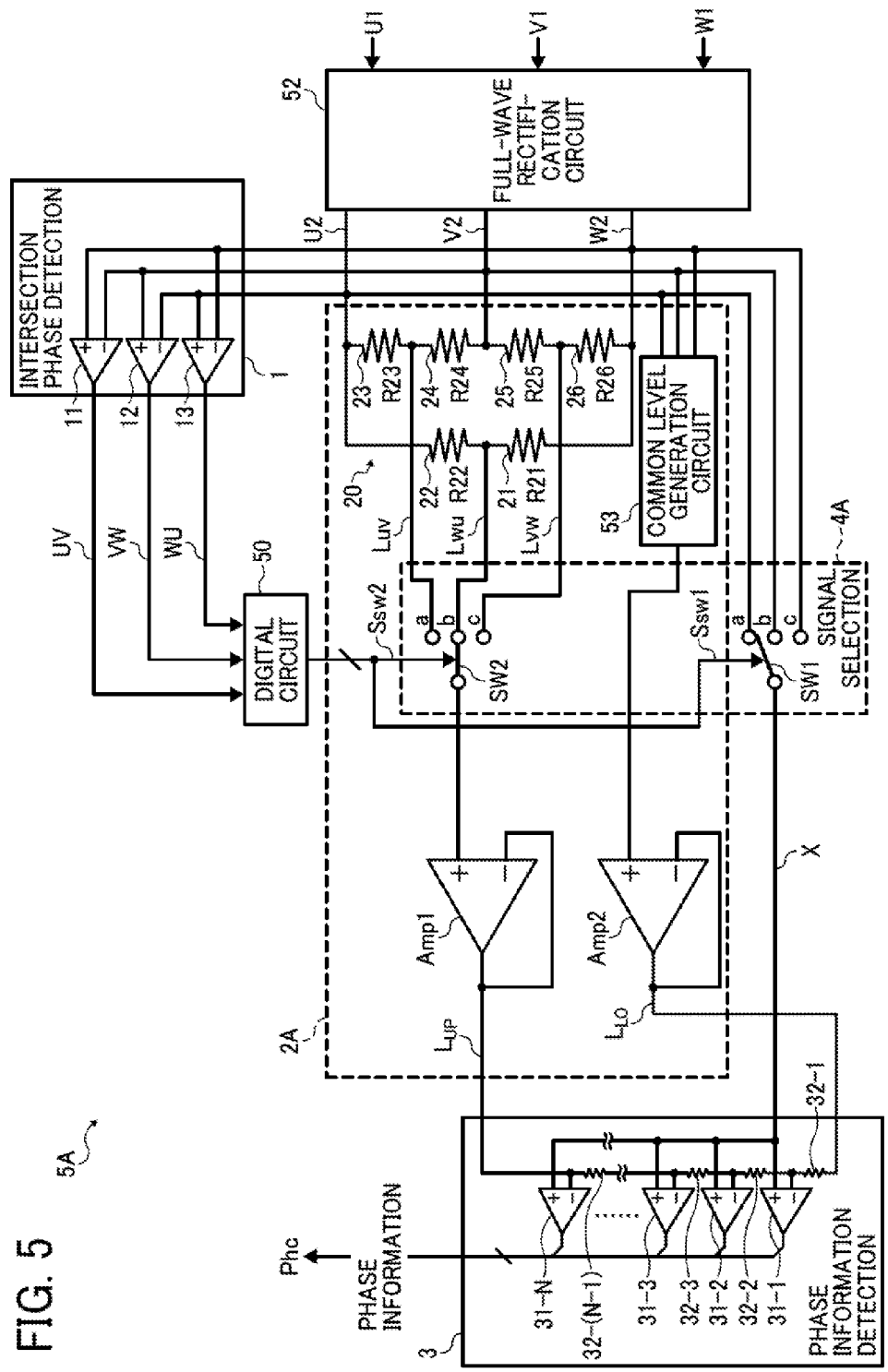
FIG. 5 is a block diagram showing the configuration of a phase detector 5A in accordance with another embodiment (Embodiment 2) of the present invention.

FIG. 5 is a block diagram showing the configuration of a phase detector 5A in accordance with another embodiment (Embodiment 2) of the present invention. In Embodiment 1, the voltage dividing levels Luv, Lvw, and Lwu are used for the bias levels $L_{UP}$ and $L_{LO}$ on the both ends of the detection section Lint. According to another embodiment, the voltage dividing levels Luv, Lvw, and Lwu may be used only for one of the bias levels $L_{UP}$ and $L_{LO}$. In Embodiment 2, the voltage dividing levels Luv, Lvw, and Lwu are used only for the upper end bias level $L_{UP}$. The phase detector 5A according to Embodiment 2 further includes a full-wave rectification circuit 52 compared to the phase detector 5 according to Embodiment 1. In addition, the phase detector 5A includes a common level generation circuit 53 in a bias level generation circuit 2A in place of the switch SW3 of the phase detector 5 according to Embodiment 1. The difference therebetween is described below.

Referring to FIG. 5, the sensor signals U1, V1, and W1 are input to the full-wave rectification circuit 52 of the phase detector 5A. The full-wave rectification circuit 52 full-wave rectifies the sensor signals U1, V1, and W1 so that a signal having a signal level smaller than a common level is inverted. The common level may be the amplitude center among the sensor signals U1, V1, and W1, for example. The full-wave rectification circuit 52 outputs sensor processing signals U2, V2, and W2 that have been full-wave rectified to the intersection phase detection circuit 1, the voltage dividing circuit 20, and the common level generation circuit 53.

The common level generation circuit 53 generates a common level from the sensor processing signals U2, V2, and W2, and outputs the common level as the lower end bias level $L_{LO}$ to the phase information detection circuit 3 through the buffer amplifier Amp2. The intersection phase detection circuit 1 generates the detection signals UV, VW, and WU based on the sensor processing signals U2, V2, and W2 and outputs them to the digital circuit 50 in the same manner as FIG. 2

The digital circuit 50 generates a control signal Ssw1 based on the detection signals UV, VW, and WU and performs a selection control for the terminals a, b, and c of the switch SW1 as follows.

(1) Select the terminal a of the switch SW1 when the detection signals VW and WU are high (Hi) and UV is low (Low), or the detection signals UV and VW are low (Low) and WU is high (Hi).

(2) Select the terminal b of the switch SW1 when the detection signals WU and UV are high (Hi) and VW is low (Low), or the detection signals VW and WU are low (Low) and UV is high (Hi).

(3) Select the terminal c of the switch SW1 when the detection signals UV and VW are high (Hi) and WU is low (Low), or the detection signals WU and UV are low (Low) and VW is high (Hi).

The digital circuit 50 generates a control signal Ssw2 based on the detection signals UV, VW, and WU and performs a selection control for the terminals a, b, and c of the switch SW2 as follows.

(1) Select the terminal a of the switch SW2 when the detection signals WU and UV are high (Hi) and VW is low (Low), or the detection signals UV and VW are low (Low) and WU is high (Hi).

(2) Select the terminal b of the switch SW2 when the detection signals VW and WU are high (Hi) and UV is low (Low), or the detection signals WU and UV are low (Low) and VW is high (Hi).

(3) Select the terminal c of the switch SW2 when the detection signals UV and VW are high (Hi) and WU is low (Low), or the detection signals VW and WU are low (Low) and UV is high (Hi).

According to the above-described selection control, one of the voltage dividing levels Luv, Lvw, and Lwu is selected by the switch SW2 in a signal selector 4A, and the selected voltage dividing level is output to the phase information detection circuit 3 through the buffer amplifier Amp1 as the upper end bias level $L_{UP}$.

Figure 6:
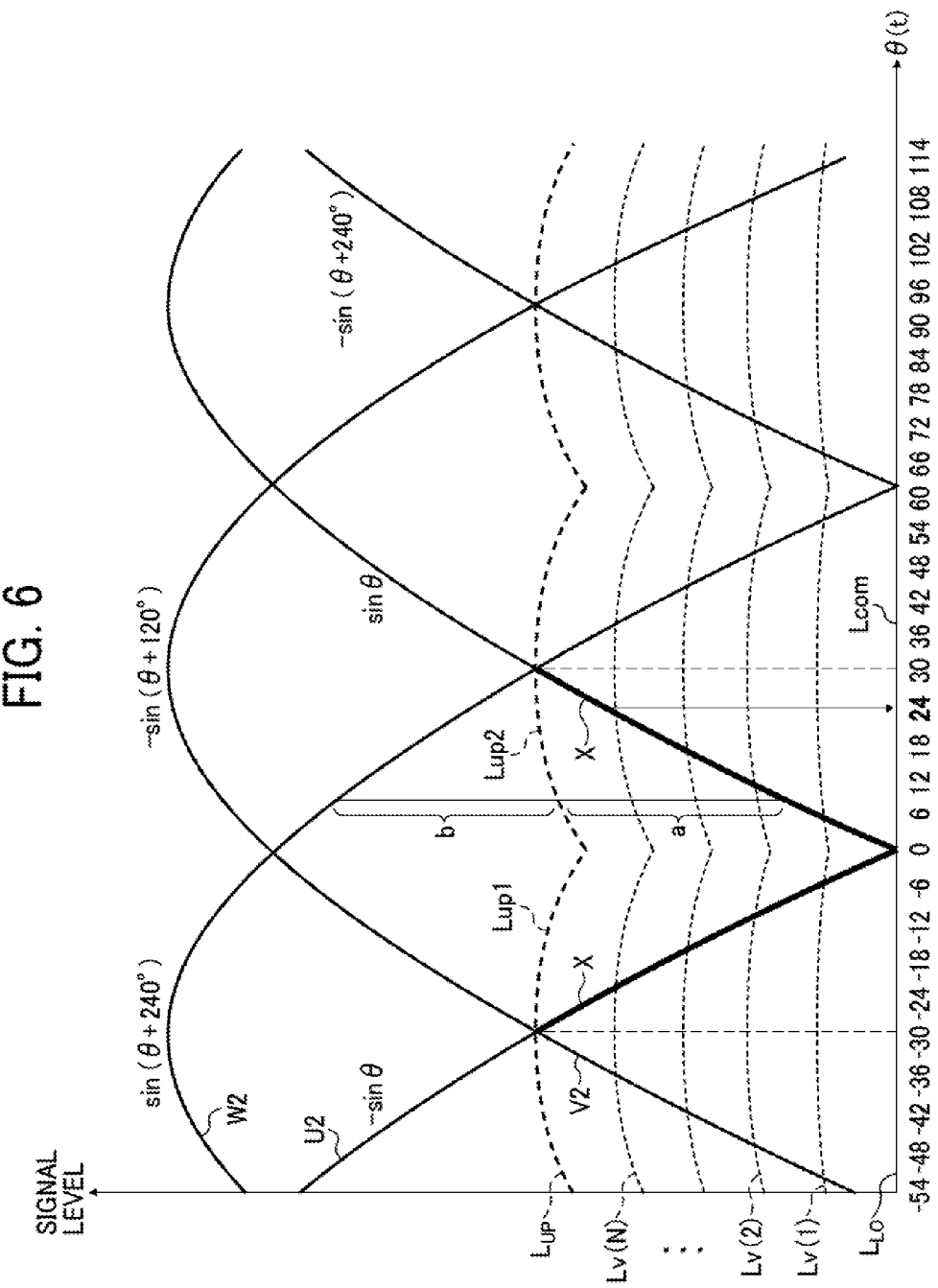
FIG. 6 is a waveform diagram of the sensor processing signals U2, V2, and W2 showing a phase detection operation of the phase detector 5A illustrated in FIG. 5.

FIG. 6 is a waveform diagram of the sensor processing signals U2, V2, and W2 showing a phase detection operation of the phase detector 5A illustrated in FIG. 5. A phase detection operation of the phase detector 5A within the phase section from −30° to 30° of the sensor processing signal U2 is described below with reference to FIG. 6, in a similar manner as in FIG. 4.

In FIG. 6, the sensor processing signals U2, V2, and W2 are full-wave-rectified and respectively represented by −sin θ, −sin(θ+120°), and −sin(θ+240°) within the phase section ranging from 180° to 360°. (U2=−sin θ, V2=−sin(θ+120°), W2=−sin(θ+240°)) Therefore, the sensor processing signal U2 is inverted with respect to the phase 0° within the phase section from −30° to 30°. In the present embodiment, according the selection control of the switch SW2, the upper end bias level $L_{UP}$ within the phase section from −30° to 30° is selected as Lup1, and the upper end bias level $L_{UP}$ within the phase section from 0° to 30° is selected as Lup2. The bias levels Lup1 and Lup2 are represented by the following formulae (4) and (5), respectively.

$$Lup1=(b\times U2+a\times V2)/(a+b) \quad (4)$$

$$Lup2=(b\times U2+a\times W2)/(a+b) \quad (5)$$

On the other hand, the lower end bias level $L_{LO}$ is defined by the common level Lcom among the sensor signals U1, V1, and W1. In FIG. 6, the lower end bias level $L_{LO}$ is zero. Similar to FIG. 4, each threshold level Lv(n) (n=1, 2, . . . , N) is set by dividing the section defined between the upper end bias level $L_{UP}$ and the lower end bias level $L_{LO}$ at the ratio αn:βn. The ratio αn:βn can be represented by the following formula (6) using the detection phase $\theta_n$.

$$\alpha n:\beta n=L_{UP}(\theta_n)-\sin(\theta_n): \sin(\theta_n) \quad (6)$$

According to the phase detector 5A, only one of the upper end bias level $L_{UP}$ and the lower end bias level $L_{LO}$ employs the voltage dividing levels Luv, Lvw, and Lwu, and the other employs a fixed value. Therefore, the circuit configuration can be simplified. Since the sensor signals U1, V1, and W1 are full-wave rectified so that the signal levels thereof are inverted, the number of the comparators 31-$n$ for comparing the signal level with each threshold level can be decreased by half to reduce the circuit area. In addition, the detection accuracy can be improved without increasing the circuit area.

In the present embodiment, the bias level generation circuit 2A generates the upper end bias level $L_{UP}$ using the voltage dividing levels Luv, Lvw, and Lwu. According to another embodiment, the bias level generation circuit 2A may generate the lower end bias level $L_{LO}$. In the present embodiment, the bias level generation circuit 2A generates a common level by use of the common level generation circuit 53. According to another embodiment, the bias level generation circuit 2A needs not necessarily include the common level generation circuit 53.

Embodiment 3

Figure 7:
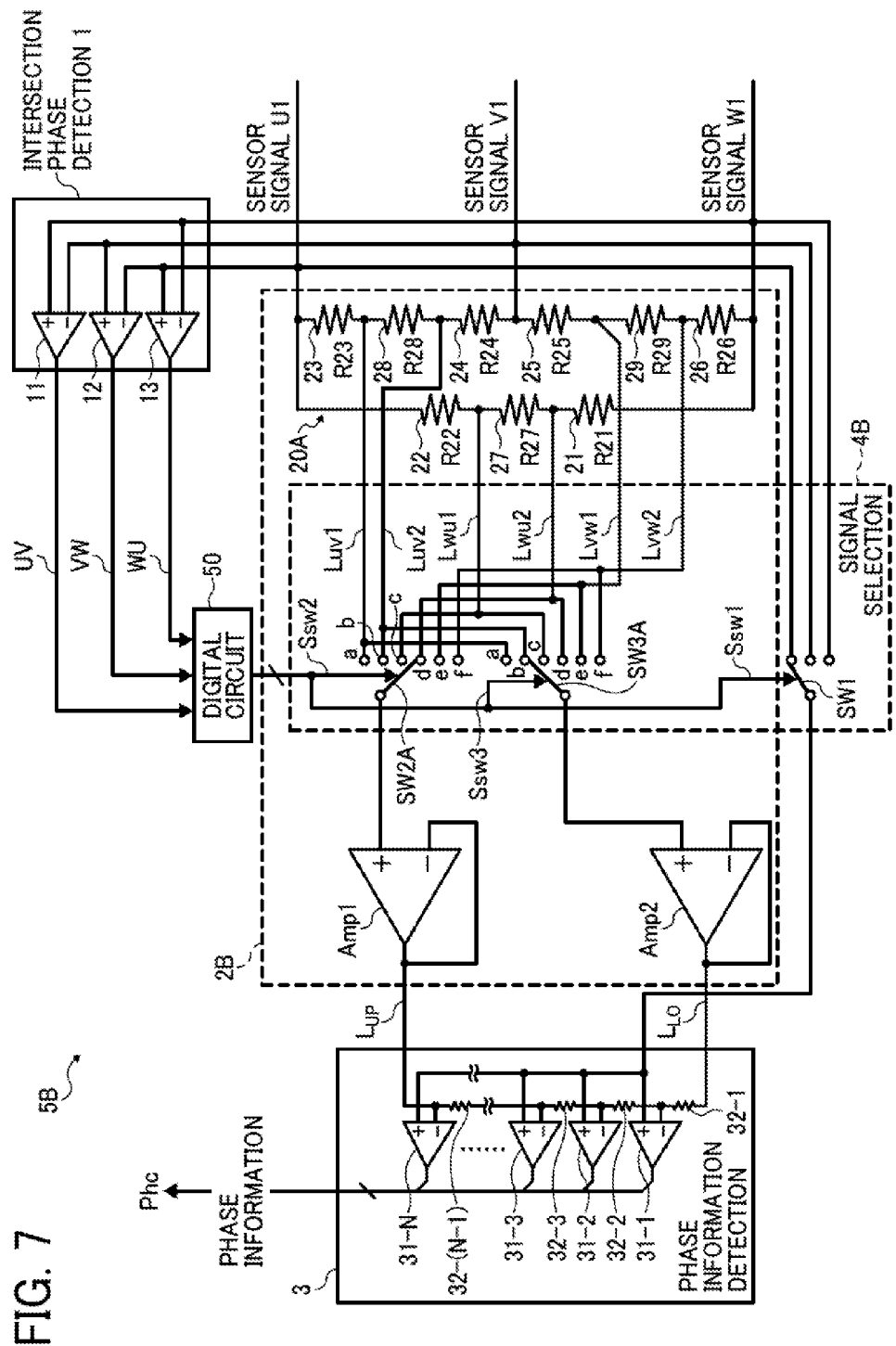
FIG. 7 is a block diagram showing the configuration of a phase detector 5B in accordance with another embodiment (Embodiment 3) of the present invention.

FIG. 7 is a block diagram showing the configuration of a phase detector 5B in accordance with another embodiment (Embodiment 3) of the present invention. In Embodiment 1, the voltage dividing levels Luv, Lvw, and Lwu are generated under the condition that the internal ratio a:b is 1:1. According to another embodiment, the internal ratio a:b needs not necessarily be 1:1. In the present embodiment, the voltage dividing levels Luv, Lvw, and Lwu are generated under the condition that a is greater than b, i.e., a>b. The phase detector 5B according to Embodiment 3 includes a bias level generation circuit 2B in place of the bias level generation circuit 2 of the phase detector 5 according to Embodiment 1. The difference therebetween is described below.

Referring to FIG. 7, the bias level generation circuit 2B includes a voltage dividing circuit 20A and switches SW2A and SW3A in place of the voltage dividing circuit 20 and the switches SW2 and SW3, respectively, in the bias level generation circuit 2 illustrated in FIG. 1. The voltage dividing circuit 20A includes resistances 21 to 29 having respective resistance values of R21 to R29. In the voltage dividing circuit 20A, the resistance 27 is connected in between the resistances 21 and 22, the resistance 28 is connected in between the resistances 23 and 24, and the resistance 29 is connected in between the resistances 25 and 26.

The voltage dividing circuit 20A outputs from the contact point between the resistances 23 and 28 a voltage dividing level Luv1 that divides the signal level difference between the sensor signals U1 and V1 at the ratio R23:(R28+R24) to the terminal a of each of the switches SW2A and SW3A. The voltage dividing circuit 20A outputs from the contact point between the resistances 28 and 24 a voltage dividing level Luv2 that divides the signal level difference between the sensor signals U1 and V1 at the ratio (R23+R28):R24 to the terminal b of each of the switches SW2A and SW3A.

Similarly, the voltage dividing circuit 20A outputs a voltage dividing level Lwu1 that divides the signal level difference between the sensor signals W1 and U1 at the ratio (R21+R27):R22 to the terminal c of each of the switches SW2A and SW3A, and a voltage dividing level Lwu2 that divides the signal level difference between the sensor signals W1 and U1 at the ratio R21:(R22+R27) to the terminal d of each of the switches SW2A and SW3A. Similarly, voltage dividing levels Lvw1 and Lvw2 are output to the respective terminals e and f of each of the switches SW2A and SW3A.

The digital circuit 50 performs a selection control for the terminals a to f of the switch SW2A based on the detection signals UV, VW, and WU as follows.

(1) Select the terminal a when the detection signals UV and VW are high (Hi) and WU is low (Low).
(2) Select the terminal b when the detection signals WU and UV are low (Low) and VW is high (Hi).
(3) Select the terminal c when the detection signals VW and WU are low (Low) and UV is high (Hi).
(4) Select the terminal d when the detection signals WU and UV are high (Hi) and VW is low (Low).
(5) Select the terminal e when the detection signals VW and WU are high (Hi) and
UV is low (Low).
(6) Select the terminal f when the detection signals UV and VW are low (Low) and WU is high (Hi).

The digital circuit 50 performs a selection control for the terminals a to f of the switch SW3A based on the detection signals UV, VW, and WU as follows.

(1) Select the terminal a when the detection signals UV and VW are low (Low) and WU is high (Hi).
(2) Select the terminal b when the detection signals WU and UV are high (Hi) and VW is low (Low).
(3) Select the terminal c when the detection signals VW and WU are high (Hi) and UV is low (Low).
(4) Select the terminal d when the detection signals WU and UV are low (Low) and VW is high (Hi).
(5) Select the terminal e when the detection signals VW and WU are low (Low) and UV is high (Hi).
(6) Select the terminal f when the detection signals UV and VW are high (Hi) and WU is low (Low).

Figure 8:
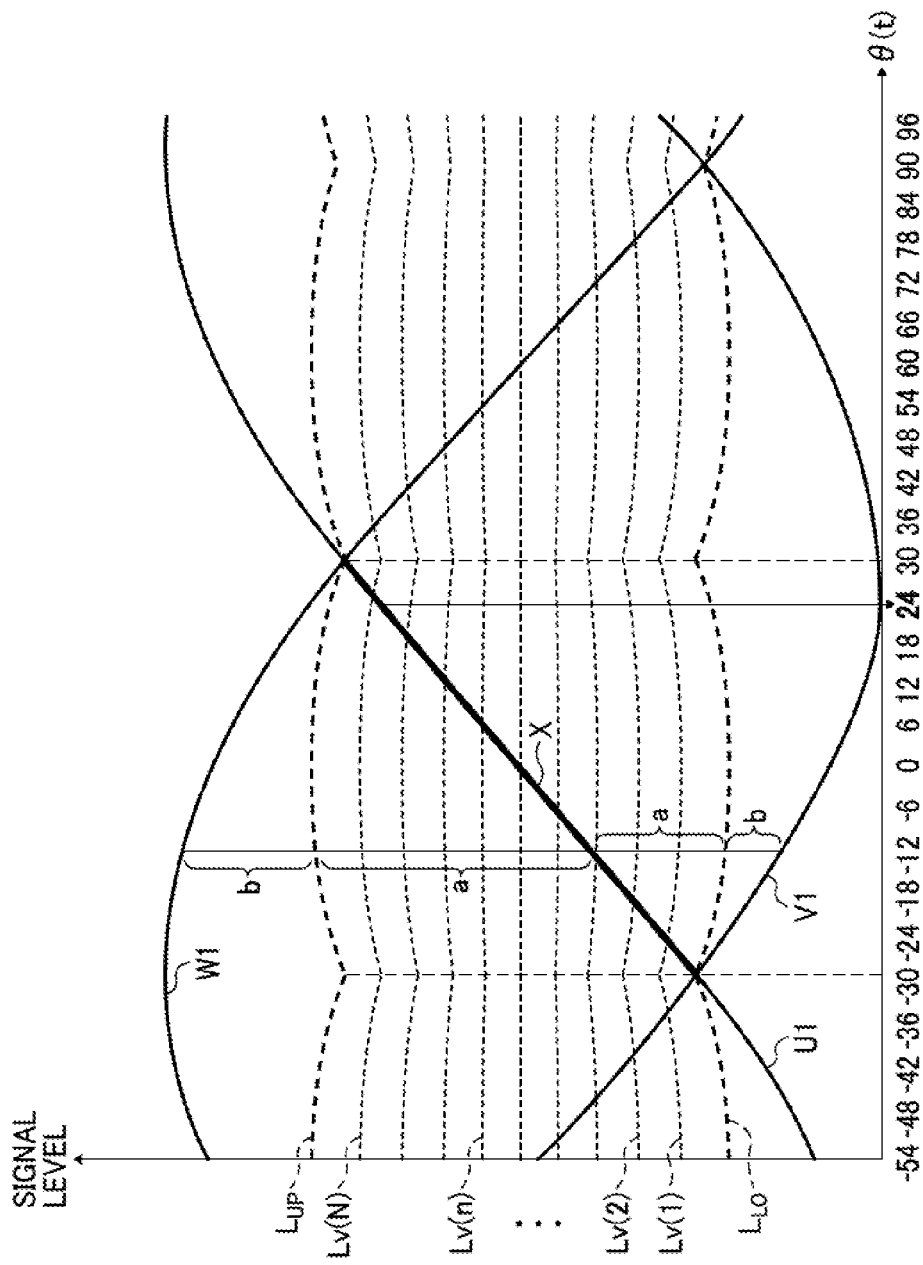
FIG. 8 is a waveform diagram of the sensor signals U1, V1, and W1 showing a phase detection operation of the phase detector 5B illustrated in FIG. 7.

FIG. 8 is a waveform diagram of the sensor signals U1, V1, and W1 showing a phase detection operation of the phase detector 5B illustrated in FIG. 7. A phase detection operation of the phase detector 5B within the phase section from −30° to 30° of the sensor signal U1 is described below with reference to FIG. 8, in a similar manner as in FIG. 4.

In FIG. 8, the upper end bias level $L_{UP}$ and the lower end bias level $L_{LO}$ are represented by the formulae (1) and (2), respectively. Similar to the case of FIG. 4, the resistance values R21 to R29 of the respective resistances 21 to 29 in the voltage dividing circuit 20A are set so as to satisfy the above formulae. According to the selection control of the switches SW2A and SW3A as described above, the upper end bias level $L_{UP}$ and the lower end bias level $L_{LO}$ are continuous at each boundary between the phase sections.

Referring to FIG. 8, the angle formed between the selected sensor signal X and the tangent line of each of the threshold levels Lv(1) to Lv(N) is greater than that in the case of FIG. 4 where a=b is satisfied, because a>b is satisfied in FIG. 8. Therefore, when a noise is generated in the selected sensor signal X, it becomes harder for the selected sensor signal X to reach the threshold level Lv(n) due to the noise. This means that the phase detector 5B cam provide an improved noise resistance in the phase detection operation.

According to the phase detector 5B, the ratio a:b is set in such a manner that each of the bias levels $L_{UP}$ and $L_{LO}$ is positioned closer to the signal level of another sensor signal than that of the selected sensor signal X. In other words, since a>b is satisfied, the phase detector 5B has an improved noise resistance in the phase detection operation compared to the phase detector 5 illustrated in FIG. 1.

It is an advantage of the phase detector 5 illustrated in FIG. 1 that the switches SW2 and SW3 each have a smaller number of terminals compared to the switches SW2A and SW3A of the phase detector 5B. Thus, the phase detector 5 can simplify the selection control while reducing the circuit area.

Embodiment 4

Figure 9:
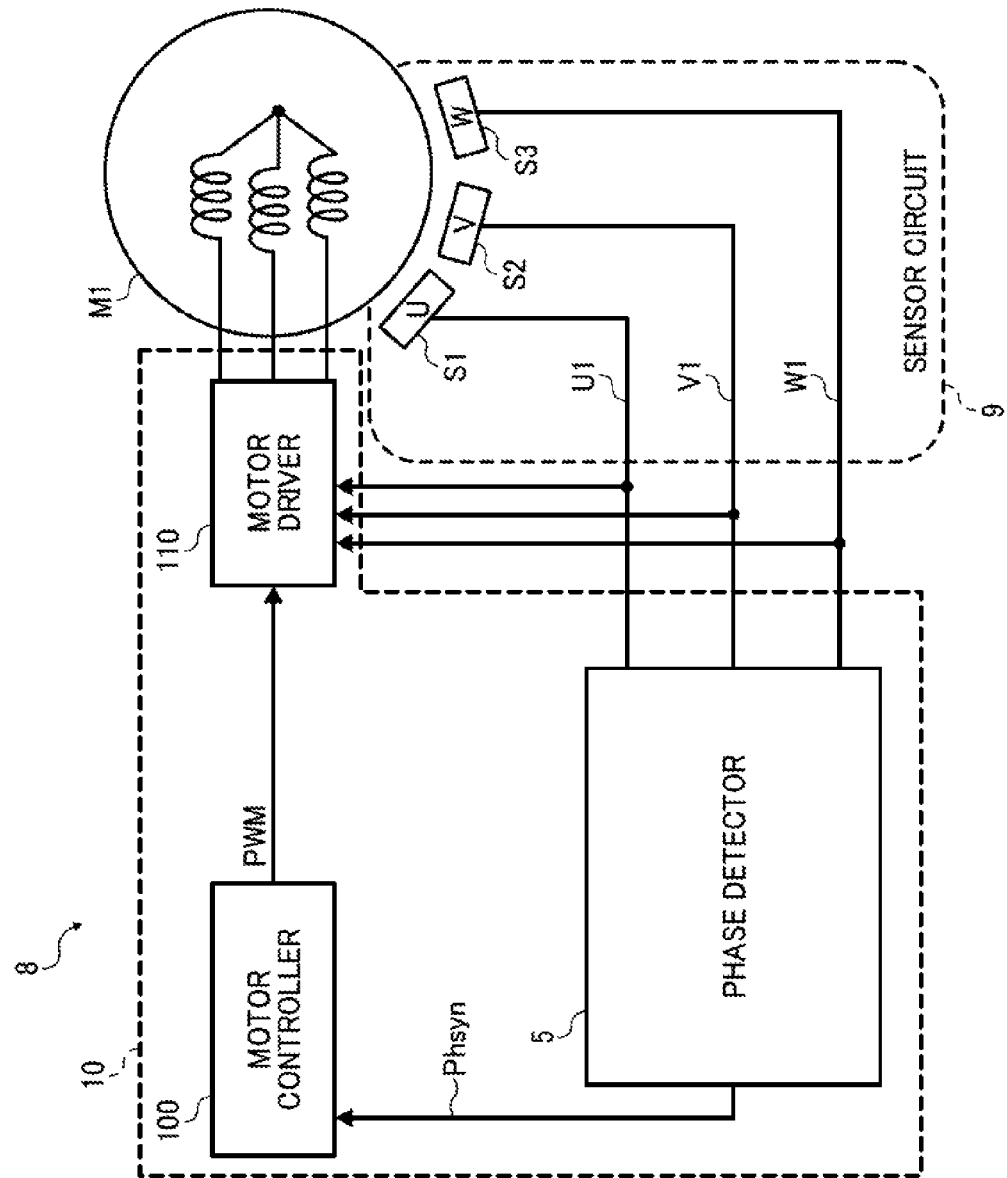
FIG. 9 is a block diagram showing the configuration of a motor apparatus 8 in accordance with another embodiment (Embodiment 4) of the present invention.

FIG. 9 is a block diagram showing the configuration of a motor apparatus 8 in accordance with another embodiment (Embodiment 4) of the present invention. Referring to FIG. 9, the motor apparatus 8 includes a motor M1, a sensor circuit 9, and a motor drive controller 10.

Referring to FIG. 9, the motor M1 is composed of, for example, a brushless DC motor. The sensor circuit 9 is disposed on the periphery of a rotor of the motor M1. The sensor circuit 9 includes sensors S1 to S3. The sensors S1 to S3 detect the rotation angles of U phase, V phase, and W phase of the motor M1 that are set at a predetermined electrical angle interval (e.g., 120°). Each of the sensors S1 to S3 is a magnetic sensor composed of, for example, a Hall element, that detects magnetic flux density fluctuating according to rotation of the motor M1. The sensor circuit 9 outputs sensor signals U1, V1, and W1 that are the detection results of the sensors S1 to S3 to the phase detector 5.

The motor drive controller 10 includes the phase information detector 5 according to Embodiment 1, a motor controller 100, and a motor driver 110. The motor controller 100 generates a pulse-width modulation (PWM) signal based on the phase information signal Phsyn and outputs it to the motor driver 110. The motor driver 110 rotary-drives the rotor of the motor M1 by flowing driving current in multiple motor coils selectively based on the PWM signal from the motor controller 100.

Figure 10:
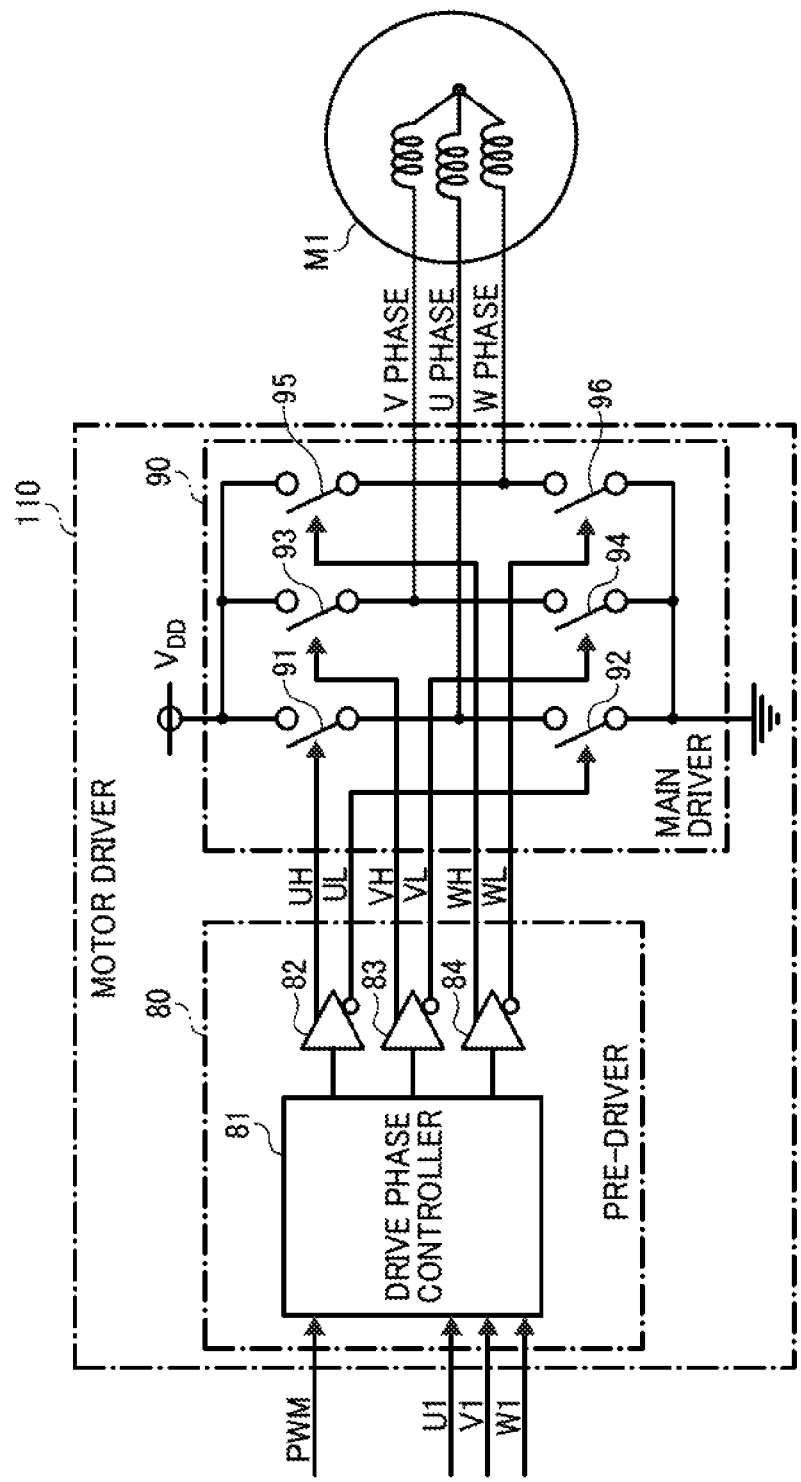
FIG. 10 is a block diagram showing the configuration of the motor driver 110 illustrated in FIG. 9.

FIG. 10 is a block diagram showing the configuration of the motor driver 110 illustrated in FIG. 9. Referring to FIG. 10, the motor driver 110 includes a pre-driver 80 and a main driver 90. Three phase coils for driving the motor M1, which may be a brushless DC motor, are identified as U phase, V phase, and W phase, and one ends of the coils is Y-connected inside the motor M1. The other ends of the coils are connected to respective high-side switching elements 91, 93, and 95 on a power source VDD side and respective low-side switching elements 92, 94, and 96 on a ground side inside the main driver 90. Switch control signals UH, UL, VH, VL, WH, and WL for driving the respective switching elements 91 to 96 are output from the pre-driver 80.

Referring to FIG. 10, the pre-driver 80 includes a drive phase controller 81 and three drive amplifiers 82, 83, and 84. The drive phase controller 81 outputs the PWM signal output from the motor controller 100 to one of the drive amplifiers 82, 83, and 84 selectively and successively based on the sensor signals U1, V1, and W1. The drive amplifier 82 generates a pair of control signals UH and UL based on the output from the drive phase controller 81, and on-off controls the high-side switching element 91 and the low-side switching element 92 according to the control signals UH and UL, respectively.

The drive amplifier 83 generates a pair of control signals VH and VL based on the output from the drive phase controller 81, and on-off controls the high-side switching element 93 and the low-side switching element 94 according to the control signals VH and VL, respectively. The drive amplifier 84 generates a pair of control signals WH and WL based on the output from the drive phase controller 81, and on-off controls the high-side switching element 95 and the low-side switching element 96 according to the control signals WH and WL, respectively.

Figure 11:
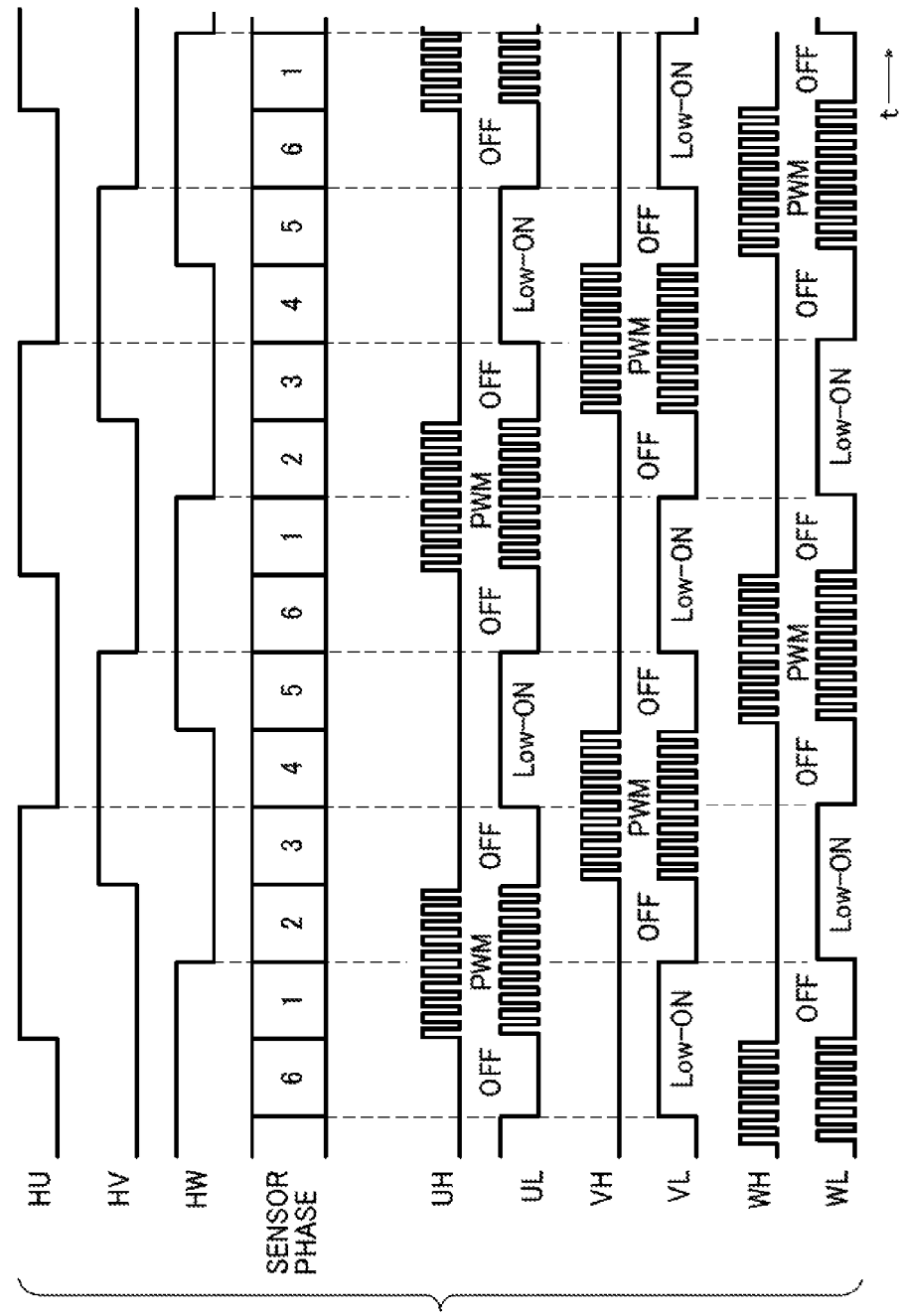
FIG. 11 is a timing diagram for various signals showing an operation of the motor driver 110 illustrated in FIG. 10.

FIG. 11 is a timing diagram for various signals showing an operation of the motor driver 110 illustrated in FIG. 10. FIG. 11 shows an example of phase switching operation based on the signal logic of the sensor signals U1, V1, and W1, which is a typical operation for driving a brushless DC motor. The motor controller 100 illustrated in FIG. 9 controls an appropriate duty cycle of the PWM signal based on the phase information of the rotating motor M1 as accurately as possible, and outputs the PWM signal to the motor driver 110.

The drive phase controller 81 illustrated in FIG. 10 generates commutation signals HU, HV, and HW that indicate whether or not the signal levels of the respective sensor signals U1, V1, and W1 equal to or exceed the common level based on the sensor signals U1, V1, and W1. The drive phase controller 81 PWM-controls one of the drive amplifiers 82, 83, and 84, and brings the pair of control signals from one of the remaining two amplifiers to a low level based on the commutation signals HU, HV, and HW. The drive phase controller 81 brings the control signals from the high-side and low-side switching elements of the remaining one amplifier to a low level and a high level, respectively.

Thus, the drive phase controller 81 divides the state into a phase in which synchronous rectification is performed according to the PWM duty cycle, a phase in which only the low-side switching element is turned on, and a phase in which both the high-side and low-side switching elements are turned off.

In the motor apparatus 8 according to Embodiment 4, an additional sensor is unnecessary since the sensors S1, S2, and S3 are commonly utilized as sensors for commutating coil currents needed for driving the motor M1 which may be composed of a brushless DC motor. Namely, since the motor drive controller 10 uses commutation signals of coil currents of a sensor typically included in a conventional motor apparatus, the phase information detector 5 can obtain phase information in large amounts.

The motor apparatus 8 or the motor drive controller 10 in accordance with Embodiment 4 includes the phase detector 5, but the configuration thereof is not limited thereto. The phase detector 5 may be replaced with the phase detector 5A or the phase detector 5B. The motor apparatus may be configured to detect zero-cross phase based on differential signals (detection signal and reverse phase signal) from the sensor circuit.

Embodiment 5

Figure 12:
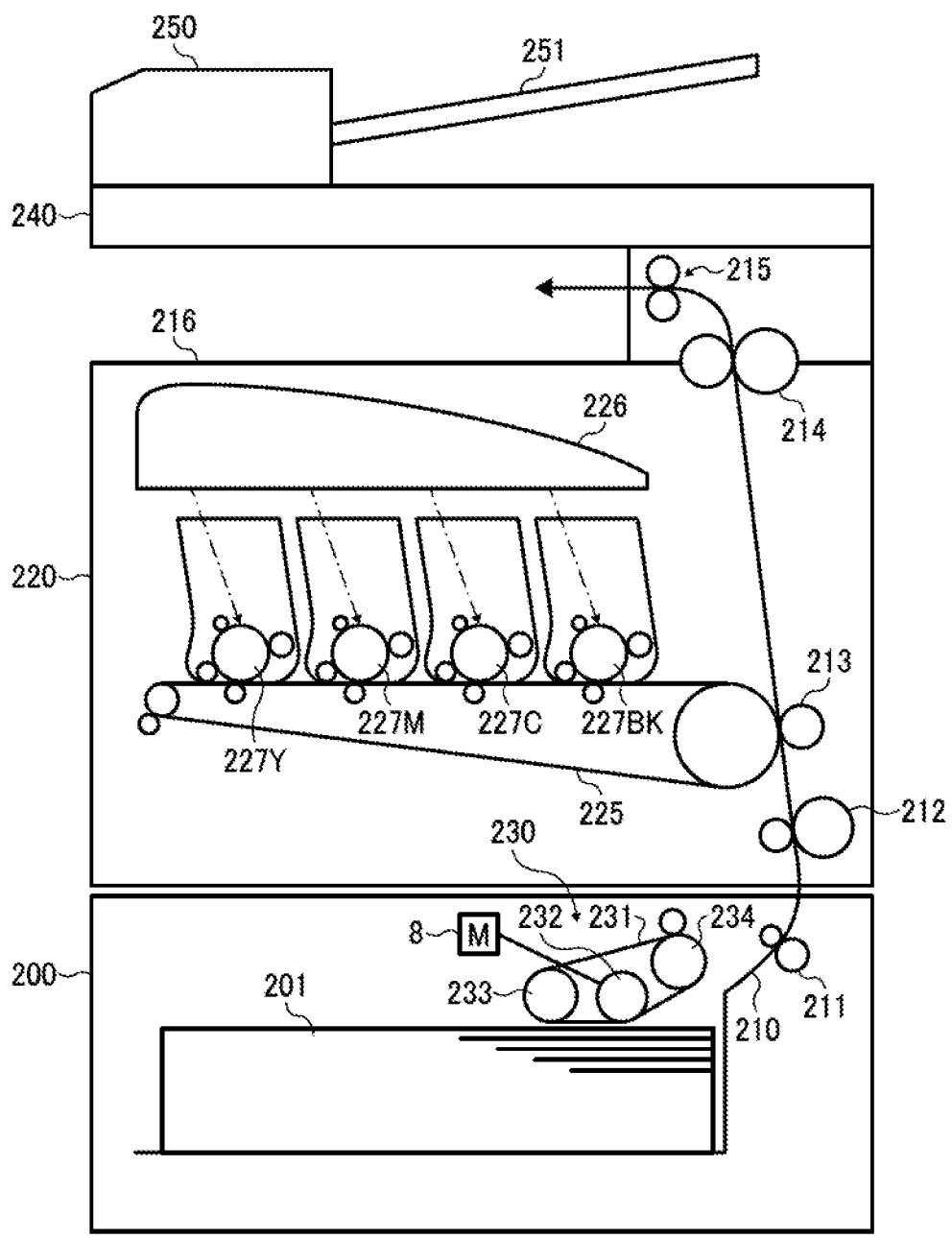
FIG. 12 is a side cross-sectional view of an image forming apparatus including sheet feeders 230 and 250 in accordance with another embodiment (Embodiment 5) of the present invention.

FIG. 12 is a side cross-sectional view of an image forming apparatus including sheet feeders 230 and 250 in accordance with another embodiment (Embodiment 5) of the present invention. Each of the sheet feeders 230 and 250 according to Embodiment 5 includes the motor apparatus 8 according to Embodiment 4. Referring to FIG. 12, the image forming apparatus may be a copier including a paper feeder 200, an image former 220, a document reader 240, and the sheet feeder 250 serving as an automatic document feeder (ADF). Hereinafter, the sheet feeder 250 may be referred to as ADF 250 for convenience.

The ADF 250 automatically separates and feeds multiple document sheets set in a document tray 251 to the document reader 240 one by one. The document reader 240 reads the document sheet fed from the ADF 250. The paper feeder 200 includes a sheet storage 201 to store multiple sheets stacked in layers and the sheet feeder 230. The sheet feeder 230 separates and feeds the multiple sheets stored in the sheet storage 201 to the image former 220 one by one. The image former 220 forms the image read by the document reader 240 on a sheet fed from the paper feeder 200.

In the paper feeder 200, the sheet feeder 230 includes the motor apparatus 8, a belt 231, a driving roller 232, and driven rollers 233 and 234. In the motor apparatus 8, the motor drive controller 10 illustrated in FIG. 9 drive-controls the motor M1 to drive the driving roller 232. The belt 231, which may be an electrostatically adsorptive belt, is stretched across the three rollers, i.e., the driving roller 232 and the driven rollers 233 and 234. In the sheet feeder 230, the belt 231 adsorbs a sheet stored in the sheet storage 201, and the adsorbed sheet is fed by the rollers 232 to 234 being driven by the motor apparatus 8.

The sheet separated by and fed from the sheet feeder 230 is further fed through a feed path 210 by a feed roller pair 211 and a registration roller pair 212. Onto the sheet thus being fed, a toner image formed in the image former 220 is transferred by a transfer roller 213. The toner image is then fused on the sheet by a fixer 214. The sheet having the fused toner image thereon is ejected onto a paper ejection tray 216 by a paper ejection roller pair 215.

The image former 220 includes an intermediate transfer belt 225 serving as a transfer belt, an irradiator 226, and multiple photoconductors 227Y, 227M, 227C, and 227BK (collectively "photoconductors 227"). The photoconductors 227Y, 227M, 227C, and 227BK are image bearers for yellow, magenta, cyan, black images, respectively, that are to be rotary driven. The irradiator 226 converts image data of the document sheet read by the document reader 240 into a light source driving signal, and a semiconductor laser in each light source is driven to emit light beam.

Each of the photoconductors 227 has a cylindrical shape and is rotary driven by a power source such as the motor apparatus 8. Each of the photoconductors 227 has a photosensitive layer on its outer peripheral surface. As the outer peripheral surfaces of the photoconductors 227 are irradiated in spots with light beams emitted from the irradiator 226, shown by dotted lines in FIG. 12, an electrostatic latent image is written on the outer peripheral surface of each of the photoconductors 227 according to the image data. The intermediate transfer belt 225 is an endless belt formed with a base material such as a resin film or a rubber. The toner images formed on the photoconductors 227 are transferred onto the intermediate transfer belt 225. The toner images transferred onto the intermediate transfer belt 225 are further transferred onto the sheet by the transfer roller 213.

Figure 13:
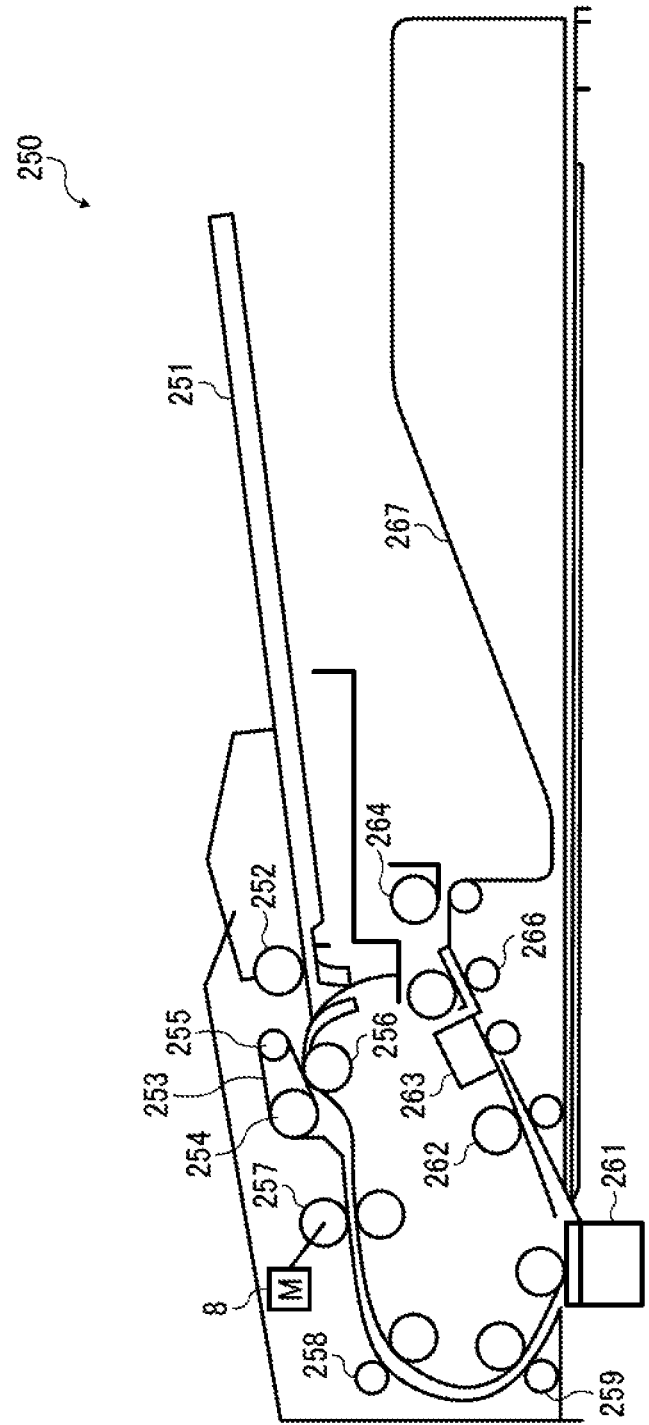
FIG. 13 is a side cross-sectional view of the ADF 250 illustrated in FIG. 12.

FIG. 13 is a side cross-sectional view of the ADF 250 illustrated in FIG. 12. The ADF 250 separates and feeds multiple document sheets set in the document tray 251 one by one as the rollers are driven by the motor apparatus 8, and reverses each document sheet upside down while folding back the document sheet. Both sides of the document sheet are respectively read by first and second fixed readers 261 and 263 each of which may be composed by an image sensor, while the document sheet is fed by the rollers being driven by the motor apparatus 8.

Referring to FIG. 13, a document sheet is set in the document tray 251. A pickup roller 252 is rotary driven as a pickup feeding motor is driven upon an operation start instruction by user, to pick up the document sheet in the document tray 251. The document sheet picked up by the pickup roller 252 is fed to a contact position of a sheet feeding belt 253 with a reverse roller 256. The sheet feeding belt 253 is stretched between a driving roller 254 and a driven roller 255.

The sheet feeding belt 253 is in contact with the reverse roller 256 that is rotary driven by a sheet feeding motor. The surface of the sheet feeding belt 253 moves in the sheet feeding direction at the contact position thereof with the reverse roller 256. By contrast, the surface of the reverse roller 256 is to move in the direction opposite to the sheet feeding direction at the contact position. Since the drive transmitter of the reverse roller 256 is equipped with a torque limiter, the surface of the reverse roller 256 comes to rotate in the sheet feeding direction when the force of the reverse roller 256 facing the sheet feeding direction exceeds the torque of the torque limiter.

The reverse roller 256 is pressed against the sheet feeding belt 253 at a predetermined pressure. When the reverse roller 256 is in direct contact with the sheet feeding belt 253 or only one document sheet is sandwiched between the reverse roller 256 and the sheet feeding belt 253 at the contact position, the reverse roller 256 corotates with the sheet feeding belt 253 or the document sheet. When multiple document sheets are sandwiched at the contact position, since the corotating force is set lower than the torque of the torque limiter, the reverse roller 256 is rotary driven in the direction opposite to the corotating direction. Accordingly, the document sheets other than that placed on the top of them are given a moving force from the reverse roller 256 in the direction opposite to the sheet feeding direction. Thus, only the sheet placed at the top is separated and multiple feeding is suppressed.

The one document sheet thus separated by the actions of the sheet feeding belt 253 and the reverse roller 256 is further fed by the sheet feeding belt 253 to butt against a pullout roller pair 257 and is stopped after a driving of the sheet feeding motor for a predetermined period. The document sheet is further fed by the sheet feeding belt 253 while butting against the pullout roller pair 257 with a predetermined amount of bend.

The document sheet is fed upon driving of the pullout roller pair 257 and an intermediate roller pair 258 and is further fed by the intermediate roller pair 258 and a reading entrance roller pair 259. To the intermediate roller pair 258, driving is transmitted from both a pullout motor that is the power source for the pullout roller pair 257 and a reading entrance motor that is the power source for the reading entrance roller pair 259. Each of the motors is composed of the motor apparatus 8. The intermediate roller pair 258 has a mechanism to determine the rotation speed according to the driving of one of the two motors the rotation speed of which is faster.

To adjust the feeding speed of the document sheet before the leading edge of the document sheet enters a nip formed between the upper and lower rollers of the reading entrance roller pair 259, deceleration of the pullout motor and normal rotary drive of the reading entrance motor and a reading motor are started. As the reading entrance motor is driven to rotate in normal direction, the reading entrance roller pair 259 is driven to rotate in the sheet feeding direction. As the reading motor is driven to rotate in normal direction, a reading exit roller pair 262 and a second reading exit roller pair 266 are driven to rotate in the sheet feeding direction. Thus, the document sheet is fed to a reading position of the first fixed reader 261 and read by the first fixed reader 261.

The document sheet passed through the first fixed reader 261 then passes through the nip of the reading exit roller pair 262. When only one side of the document sheet is to be read, it is unnecessary that the other side of the document sheet is read by the second fixed reader 263. In this case, the document sheet is ejected upon rotary drive of a paper ejection roller pair 264 without being read by the second fixed reader 263. By contrast, when both sides of the document sheet are to be read, a time until the document sheet reaches the second fixed reader 263 is calculated based on pulse count of the reading motor, and the document sheet is read by the second fixed reader 263.

The motor apparatus 8 according to Embodiment 4 may be applied to any of the motors used in the sheet feeders 230 and 250. For example, the motor apparatus 8 may be used as a power source for each of the rollers illustrated in FIGS. 11 and 12. In particular, the motor apparatus 8 may be used as a motor for driving the driving roller 254.

Modification

Figure 14:
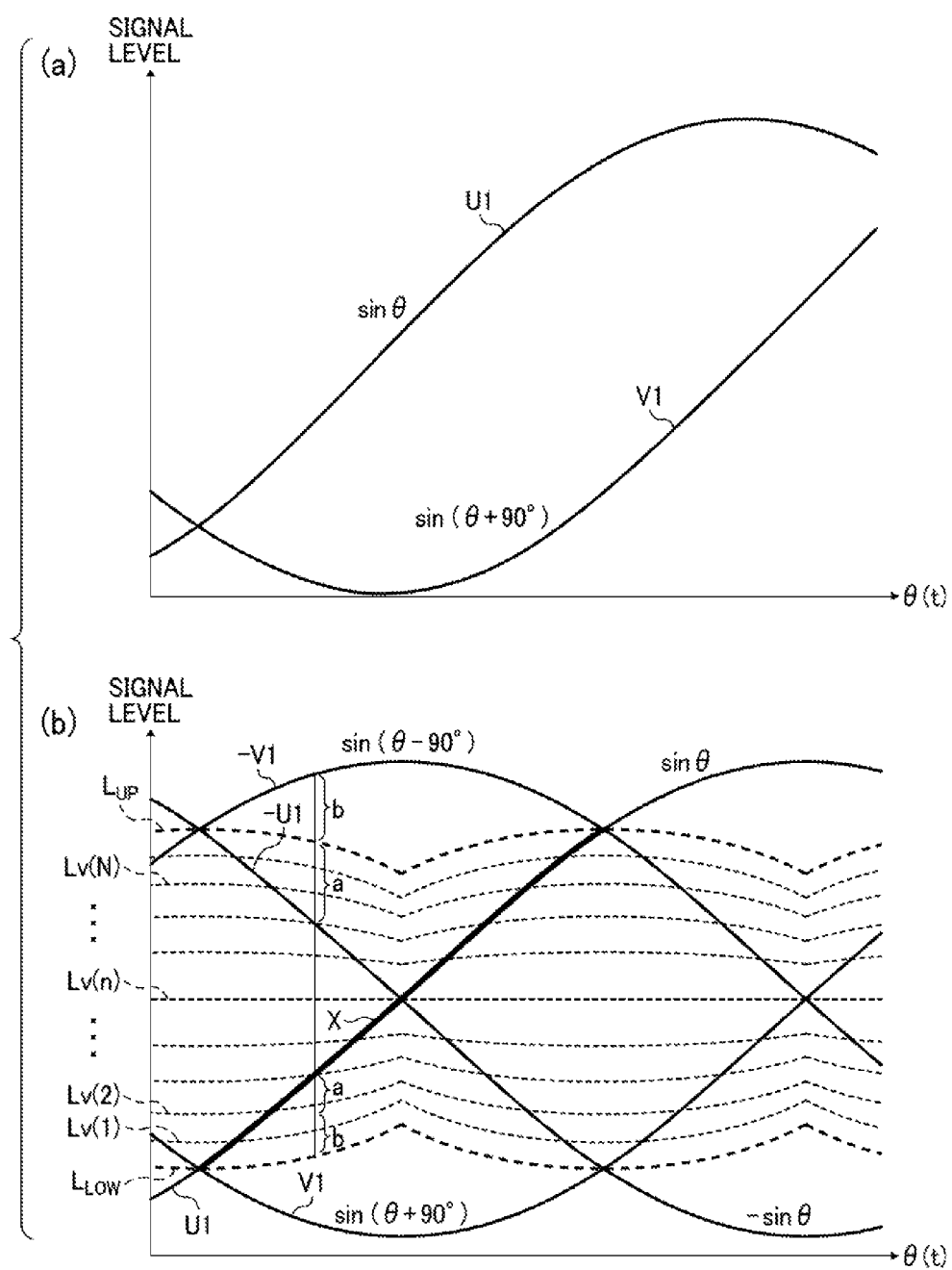
FIG. 14 is a waveform diagram of the sensor signals U1 and V1 showing a phase detection operation according to another embodiment (Modification) of the present invention.

FIG. 14 is a waveform diagram of the sensor signals U1 and V1 showing a phase detection operation according to another embodiment (Modification) of the present invention. In the above-described embodiments, the phase detectors 5, 5A, and 5B each perform a phase detection operation using the three sensor signals U1, V1, and W1. According to another embodiment, the phase detection operation may be performed using multiple sensor signals in an appropriate number. For example, when two sensor signals U1 and V1 are set apart with a phase difference of 90° as illustrated in the graph (a), reverse phase signals of the sensor signals U1 and V1 may be generated and superimposed on one another to determine the selected sensor signal X based on the intersections of the sensor signals U1 and V1 and the reverse phase signals as shown in the graph (b).

The bias levels $L_{UP}$ and $L_{LO}$ are set by dividing the signal level difference between the selected sensor signal X and one of the signal among the sensor signals U1 and V1 and the reverse phase signals thereof which has a signal level greater or smaller than that of the selected sensor signal X, in the same manner as Embodiment 1. The phase detection operation is performed while changing the threshold levels Lv(1) to Lv(N) with respect to the biphase sensor signals U1 and V1 according to the bias levels $L_{UP}$ and $L_{LO}$.

In the above-described embodiments, the phase detectors 5, 5A, and 5B include the bias level generation circuits 2, 2A, and 2B, respectively, but means for generating bias level is not limited thereto. For example, in generating the voltage dividing levels Luv, Lvw, and Lwu, the resistance values may be switched by switches in place of the voltage dividing circuit 20 or 20A.

In the phase detectors 5, 5A, and 5B, the upper and lower ends of the detection section Lint are respectively defined by the bias levels $L_{UP}$ and $L_{LO}$. According to another embodiment, they may be defined by the upper and lower limits of a threshold level.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

What is claimed is:

1. A phase detector, comprising:
    a signal selector to select, as a selected sensor signal, one of a plurality of sensor signals each having a signal level corresponding to a phase of a rotor;
    a bias level generator to divide a signal level difference between a pair of sensor signals at a first ratio, the pair of sensor signals including the selected sensor signal and other sensor signal of the plurality of sensor signals other than the selected sensor signal, to generate a first bias level; and
    a phase information detector to generate a threshold level corresponding to the phase of the rotor based on the first bias level, and to detect the signal level of the selected sensor signal reaching the threshold level.

2. The phase detector according to claim 1, wherein the phase information detector generates the threshold level corresponding to the phase of the rotor based on the first bias level, so that the first bias level coincides with the signal level of the selected sensor signal at a phase of an intersection of the pair of sensor signals.

3. The phase detector according to claim 1, wherein the phase information detector divides a signal level section at a second ratio corresponding to the phase of the rotor, the signal level section having an upper end or a lower end corresponding to the first bias level, to generate the threshold level.

4. The phase detector according to claim 1,
    wherein the bias level generator divides a first signal level difference between the selected sensor signal and a first sensor signal having a signal level greater than that of the selected sensor signal at the first ratio to generate the first bias level, and
    wherein the bias level generator divides a second signal level difference between the selected sensor signal and a second sensor signal having a signal level smaller than that of the selected sensor signal at the first ratio to generate a second bias level.

5. The phase detector according to claim 4, wherein the phase information detector divides a signal level section at a second ratio corresponding to the phase of the rotor, the signal level section having an upper end and a lower end respectively corresponding to the first bias level and the second bias level, to generate the threshold level.

6. The phase detector according to claim 1,
    wherein the signal selector selects, as the selected sensor signal, one of the plurality of sensor signals for each of a plurality of phase sections, and connects the selected sensor signals at boundaries between the phase sections adjacent to each other, and
    wherein the bias level generator generates the first bias level for each of the plurality of phase sections, and connects the generated first bias levels at the boundaries between the phase sections adjacent to each other.

7. The phase detector according to claim 1, wherein the first ratio has a value that divides the signal level difference between the pair of sensor signals into two halves.

8. The phase detector according to claim 1, wherein the first ratio has a value that divides the signal level difference between the pair of sensor signals so that the first bias level comes closer to a signal level of the other sensor signal than the signal level of the selected sensor signal.

9. The phase detector according to claim 1, further comprising:
    an intersection phase detector to compare two of the plurality of sensor signals to detect a phase of an intersection of the two sensor signals,
    wherein the signal selector selects one of the plurality of sensor signals upon detection of the phase of the intersection by the intersection phase detector.

10. The phase detector according to claim 1, wherein each of the sensor signals has a waveform of sine wave or a wave similar to sine wave.

11. The phase detector according to claim 1, wherein the signal level of each of the sensor signals corresponds to a rotation phase of the rotor including a coil having a plurality of phases.

12. A motor drive controller, comprising:
   the phase detector according to claim 1 to output a phase detection result;
   a motor controller to output a signal based on the phase detection result; and
   a motor driver to drive a motor based on the signal.

13. A motor apparatus, comprising:
   the motor drive controller according to claim 12; and
   a motor to be driven by the motor drive controller.

14. A sheet feeder, comprising:
   the motor apparatus according to claim 13;
   a plurality of rollers at least one of which is to be driven by the motor apparatus; and
   a belt stretched across the plurality of rollers to be fed by the plurality of rollers.

15. A method of detecting phase, comprising:
   selecting, as a selected sensor signal, one of a plurality of sensor signals each having a signal level corresponding to a phase of a rotor;
   dividing a signal level difference between a pair of sensor signals at a first ratio, the pair of sensor signals including the selected sensor signal and other sensor signal of the plurality of sensor signals other than the selected sensor signal (X), to generate a first bias level;
   generating a threshold level corresponding to the phase of the rotor based on the first bias level; and
   detecting the signal level of the selected sensor signal reaching the threshold level.

* * * * *